United States Patent
Garber et al.

(10) Patent No.: US 6,667,465 B2
(45) Date of Patent: Dec. 23, 2003

(54) HOUSEHOLD ELECTRONIC TOASTER AND METHOD OF MANUFACTURE

(75) Inventors: Alan M. Garber, Richmond, VA (US); Paul M. Blankenship, Glen Allen, VA (US); James R. Gaynor, Richmond, VA (US); Derwood S. DeLong, Goochland, VA (US); Nhiem V. Nguyen, Glen Allen, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 0 days.

(21) Appl. No.: 10/213,178

(22) Filed: Aug. 6, 2002

(65) Prior Publication Data

US 2002/0190053 A1 Dec. 19, 2002

Related U.S. Application Data

(62) Division of application No. 08/944,521, filed on Oct. 6, 1997, now Pat. No. 6,429,407.

(51) Int. Cl.⁷ .................................................. A47J 37/08
(52) U.S. Cl. ........................ 219/413; 219/386; 99/389
(58) Field of Search ................................. 219/385, 386, 219/406, 411, 413, 521; 99/326, 327, 385, 389, 391

(56) References Cited

U.S. PATENT DOCUMENTS

| | | | | |
|---|---|---|---|---|
| 3,558,855 A | * | 1/1971 | Stanek et al. ............... | 219/385 |
| 5,121,678 A | * | 6/1992 | Fresno ......................... | 99/391 |
| 5,924,355 A | * | 7/1999 | Belknap et al. ................ | 99/389 |
| 6,104,001 A | * | 8/2000 | Huggler ....................... | 219/386 |
| 6,476,360 B1 | * | 11/2002 | Huggler et al. ............. | 219/386 |
| 6,559,423 B2 | * | 5/2003 | Nguyen et al. ............. | 219/386 |

* cited by examiner

Primary Examiner—Joseph Pelham
(74) Attorney, Agent, or Firm—Roger S. Dybvig

(57) ABSTRACT

A toaster having an electronic circuit including a chip-on-board ASIC that controls the operation of toaster heating elements and an electromagnet to which relatively high voltage is applied to hold an armature carried by a bread carriage and toaster-operating assembly. The armature is freely suspended from a bread carriage and toaster-operating assembly and accurately guided onto the electromagnet when the bread carriage is lowered. The toaster has a one-piece main frame that includes both a base frame plate and a rear frame plate. Several economies are obtained by virtue the construction of the toaster. A one-piece control support member is mounted on the base frame plate that supports both mechanical and electronic assemblies for controlling the operation of the toaster in predetermined relative positions. The armature can move upward relative to the bread carriage at the end of a toasting cycle if the bread carriage accidentally becomes stuck so that the power switches will assuredly be opened at the end of toasting cycle. A barrier is provided between live electricity and the toaster cover. A crumb tray is provided that may be mounted on the base frame member without the use of tools or additional parts.

2 Claims, 17 Drawing Sheets

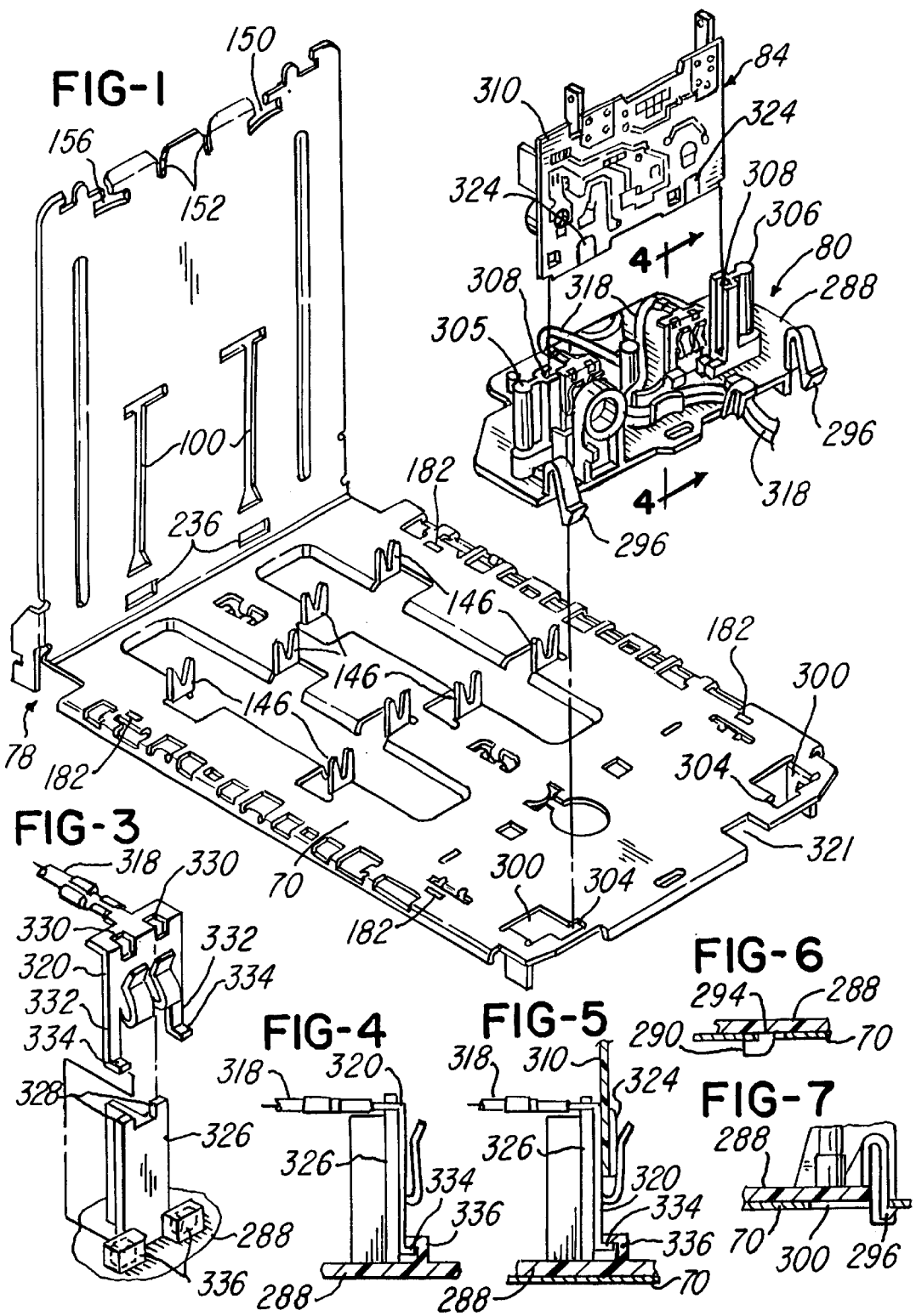

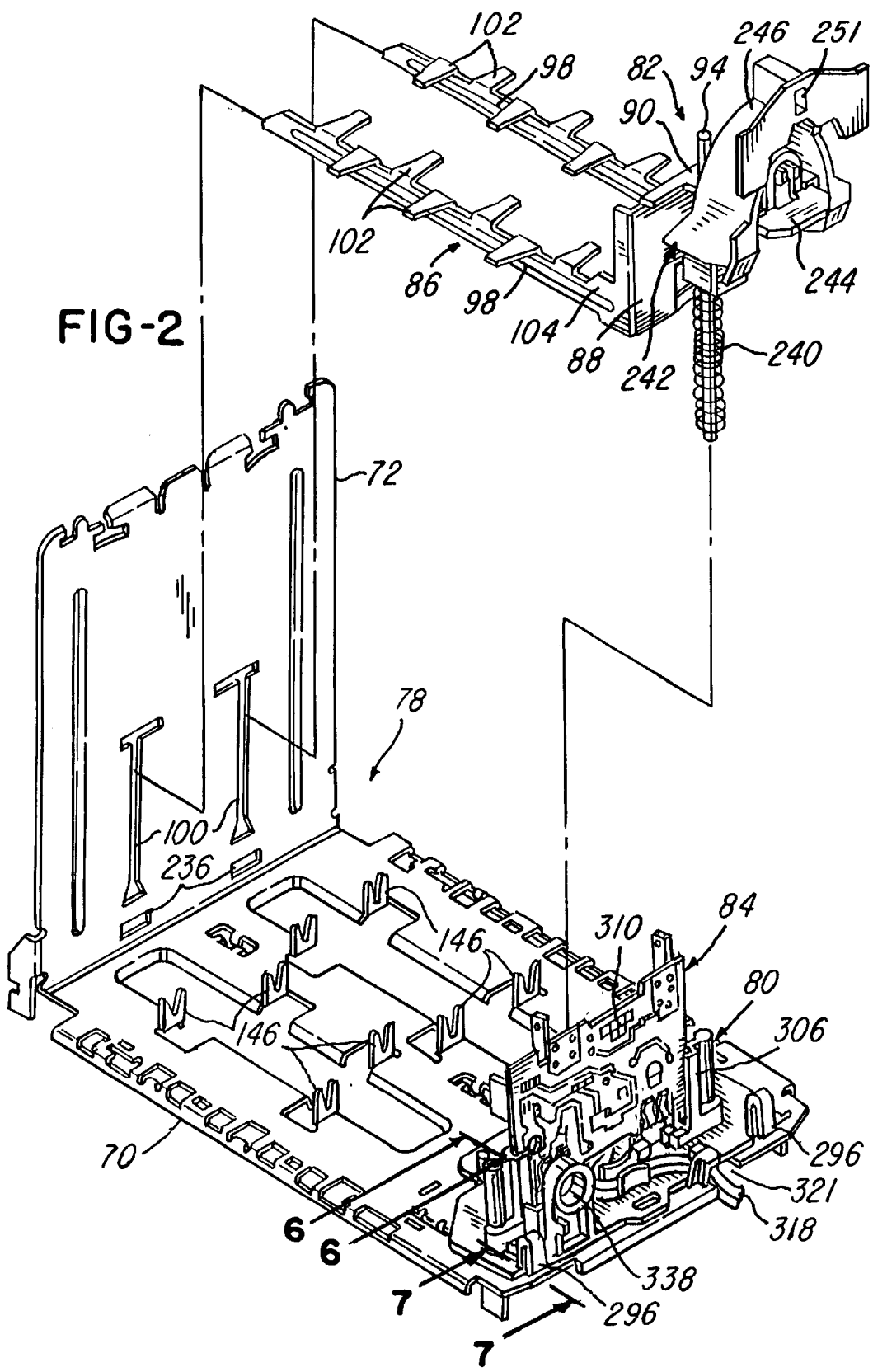

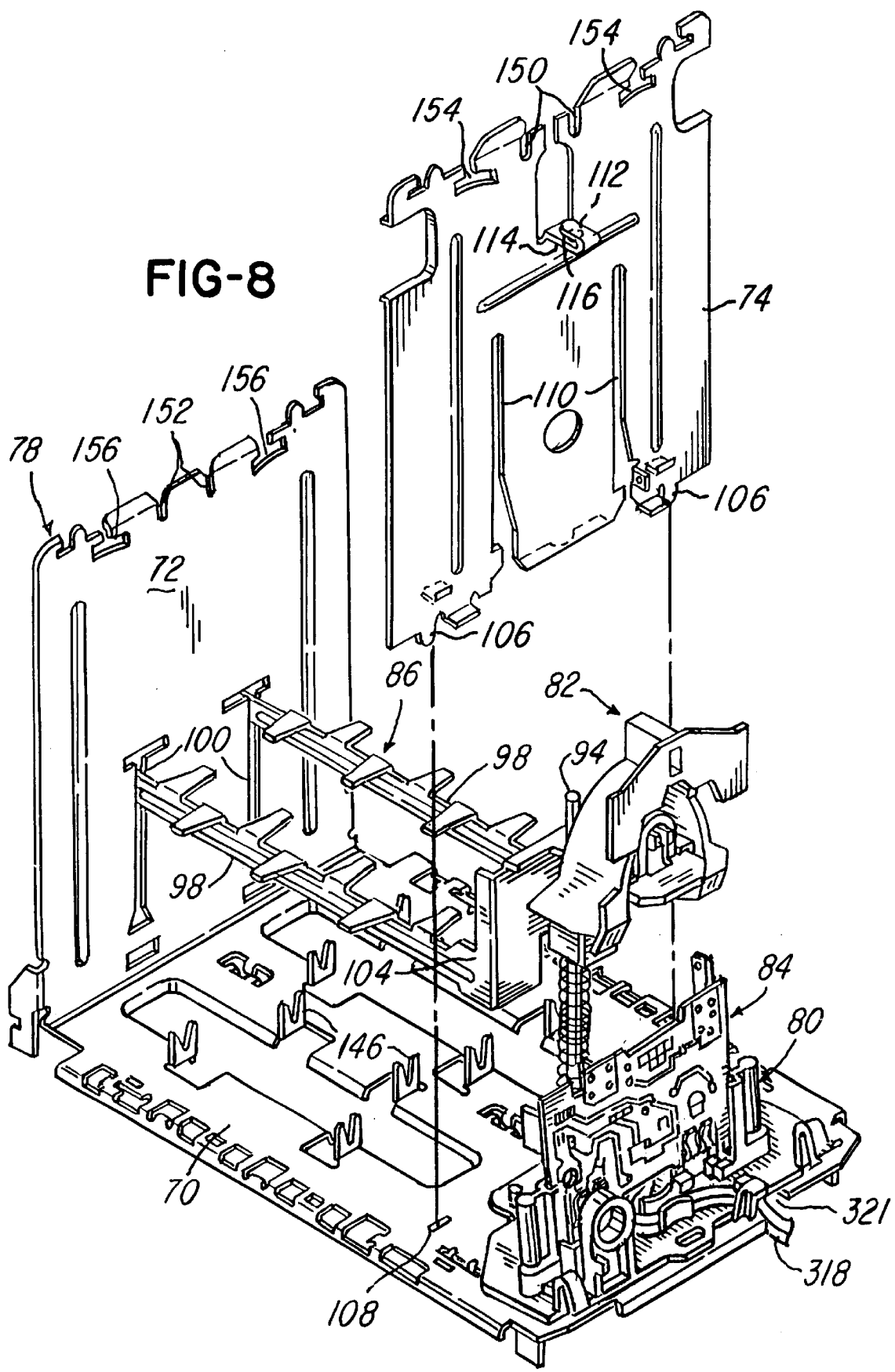

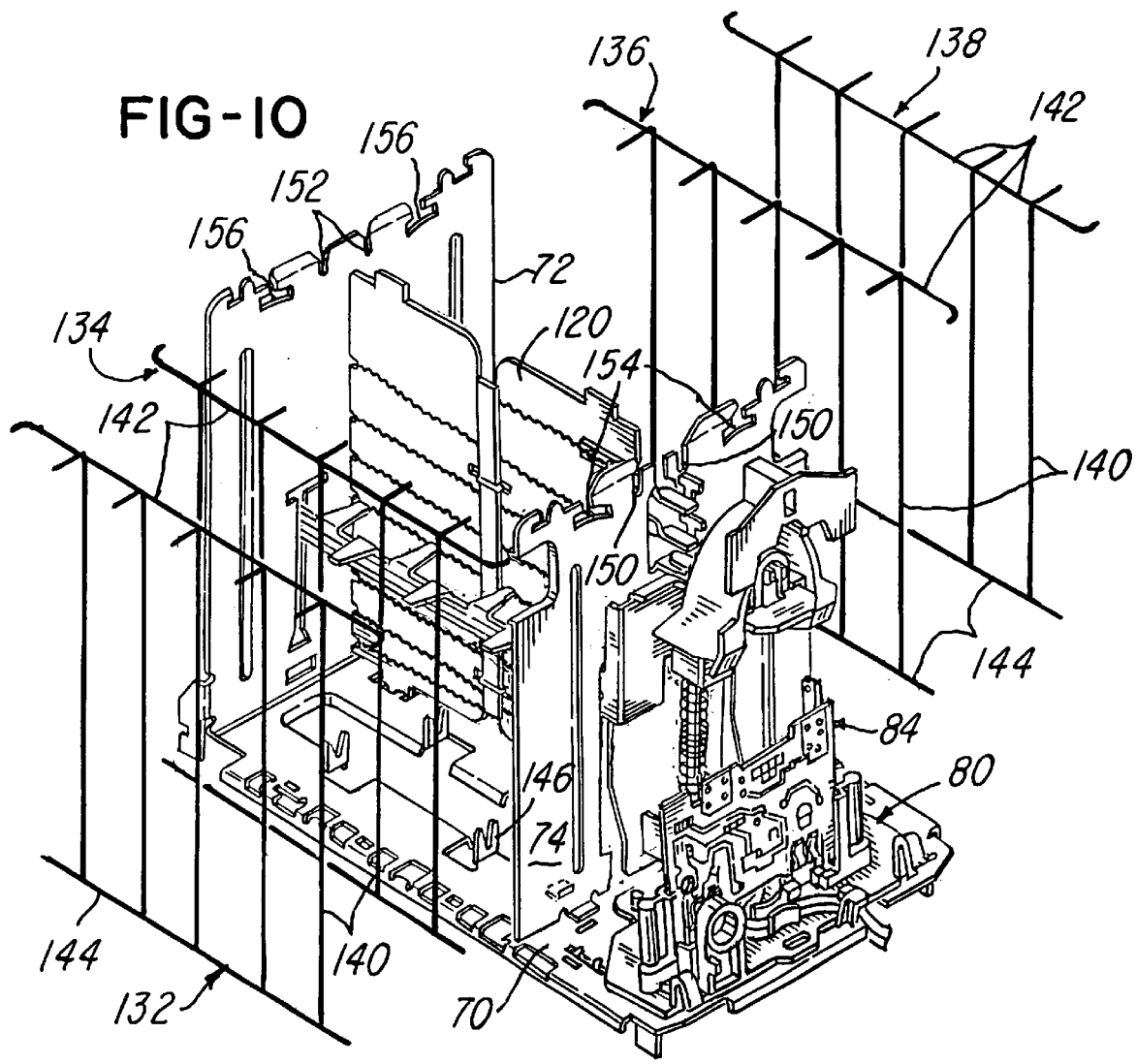
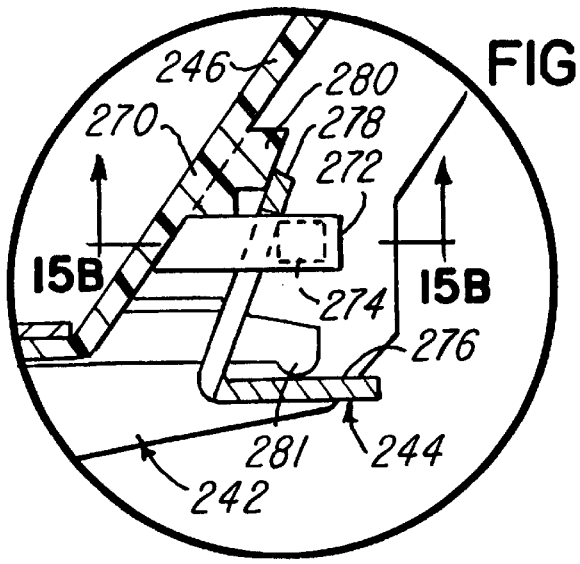
FIG-10
FIG-15A
FIG-15B

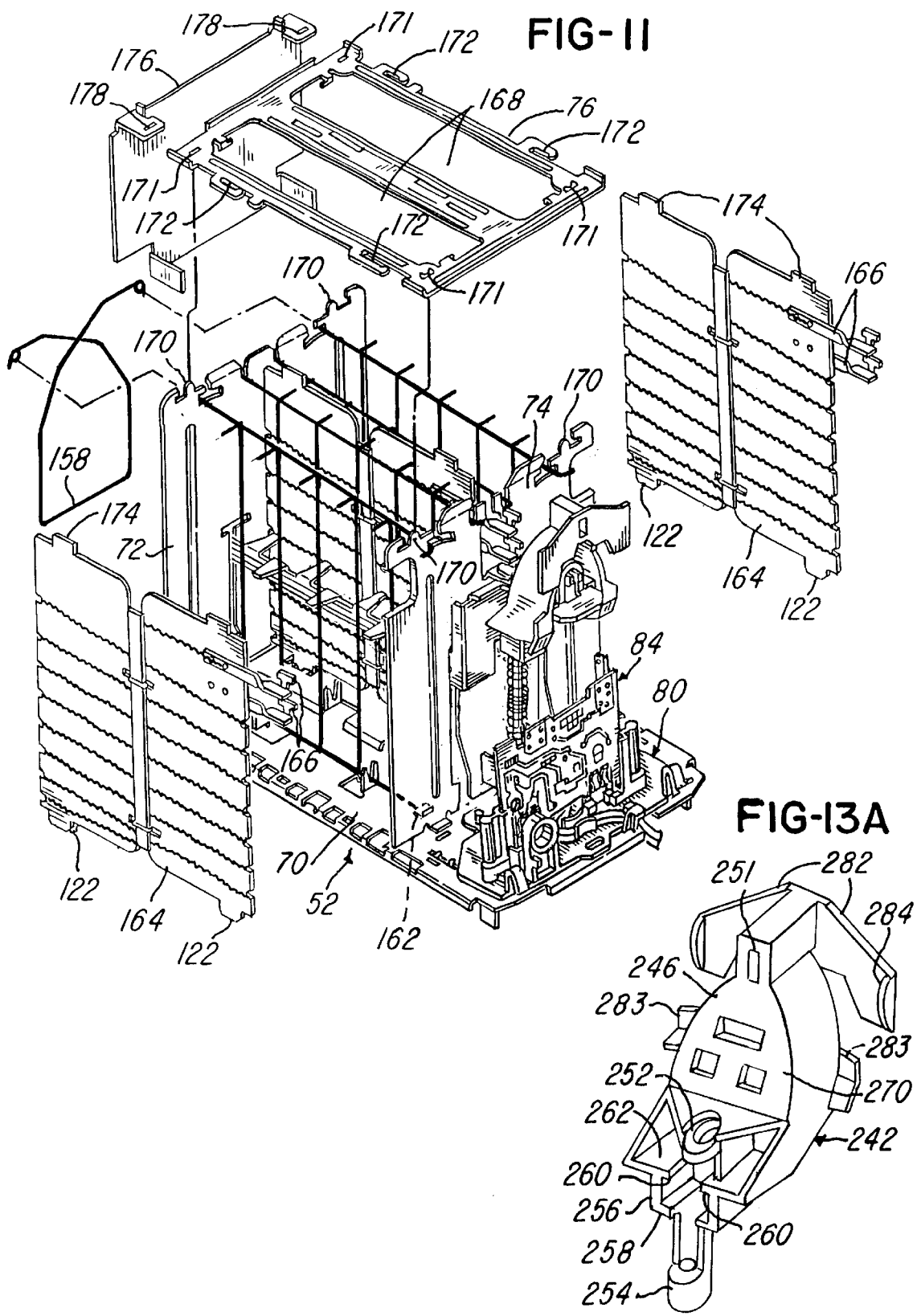

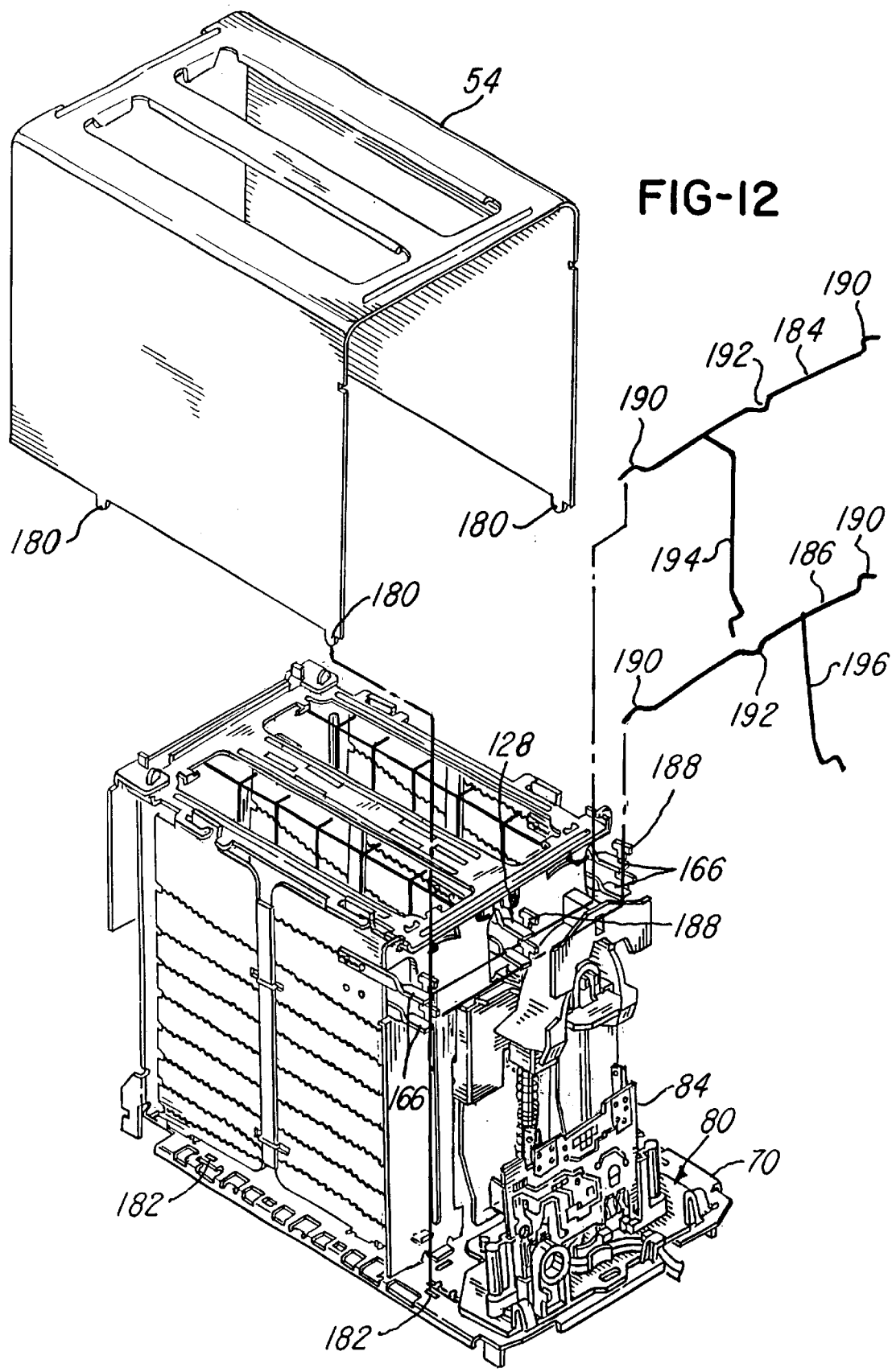

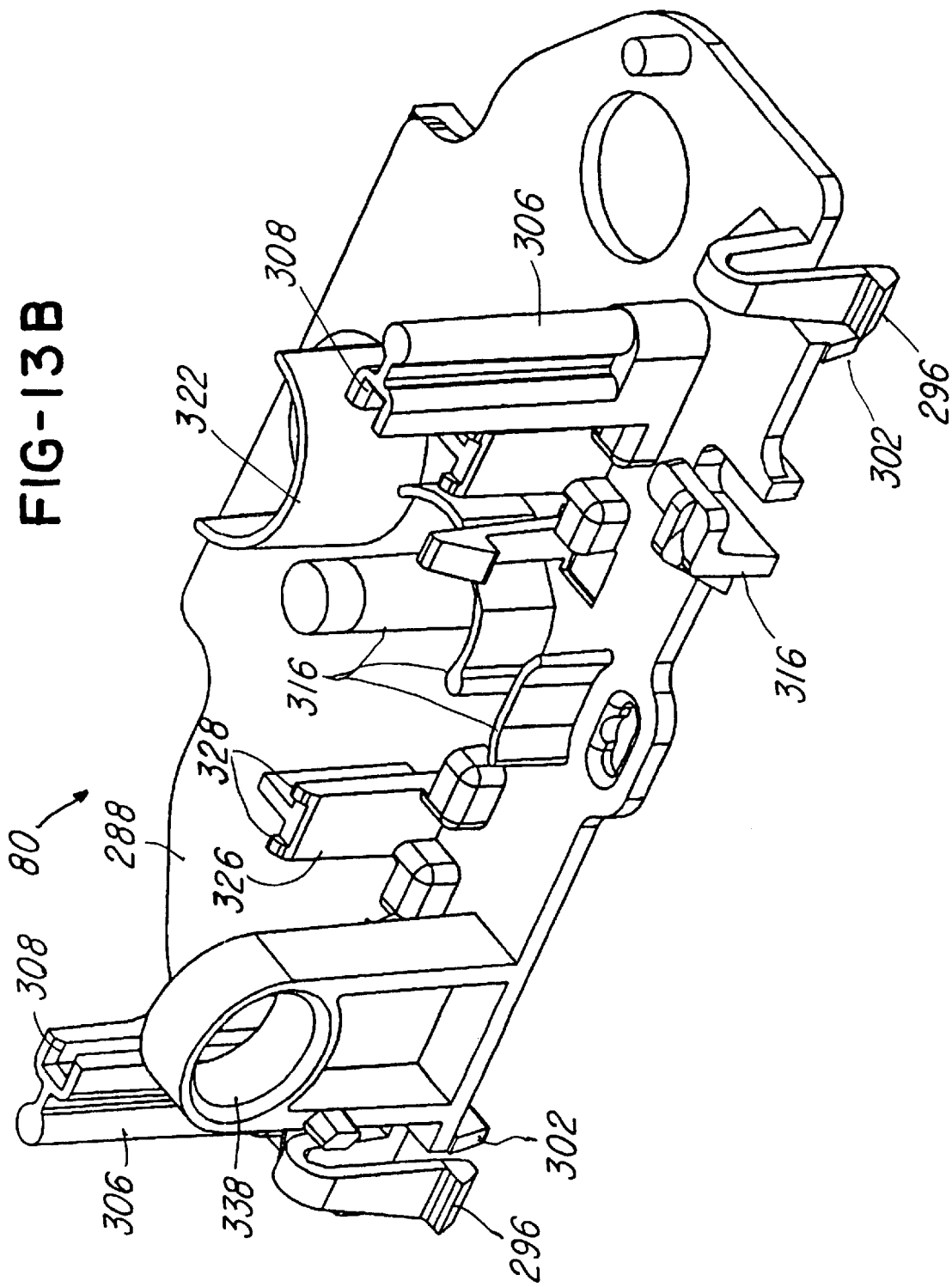

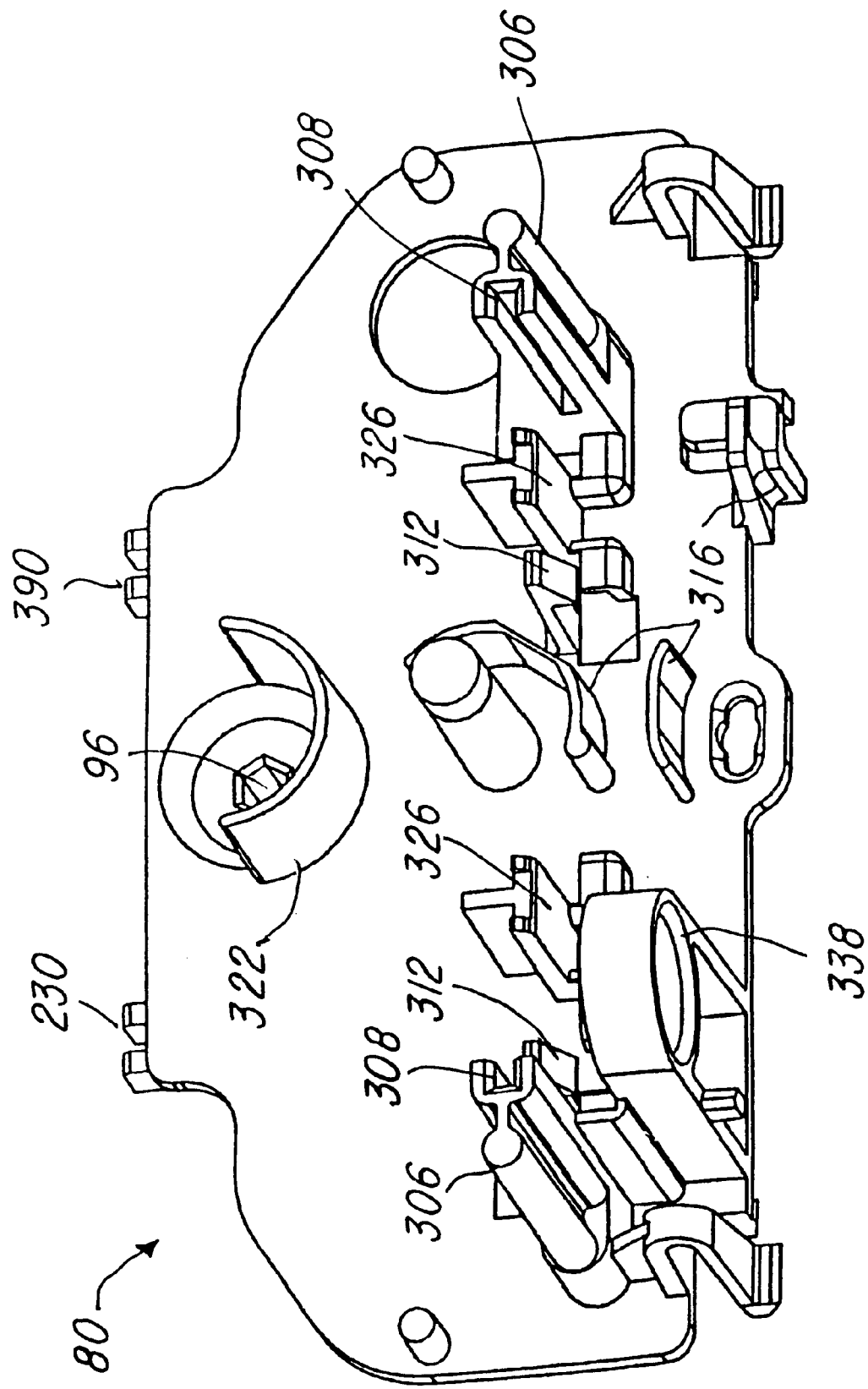

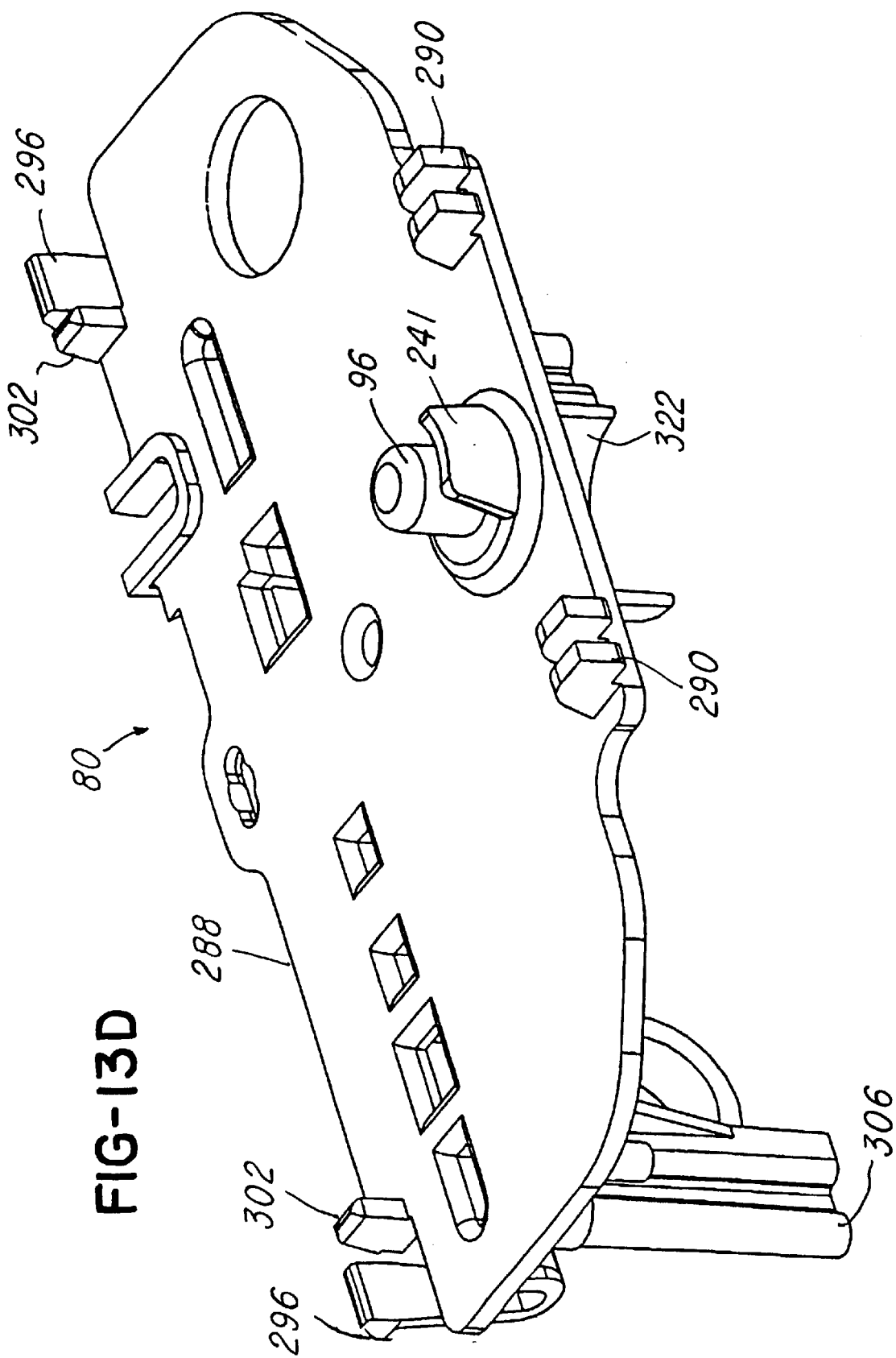

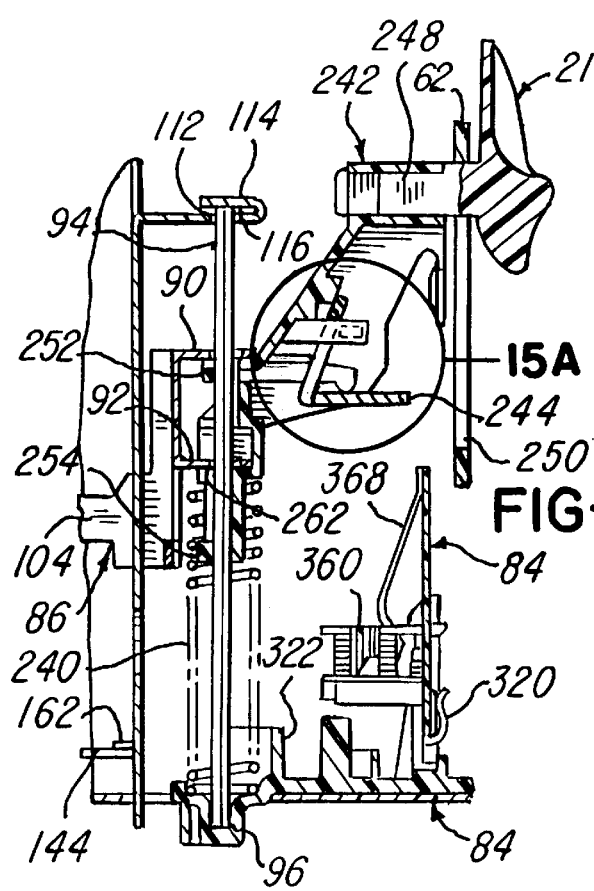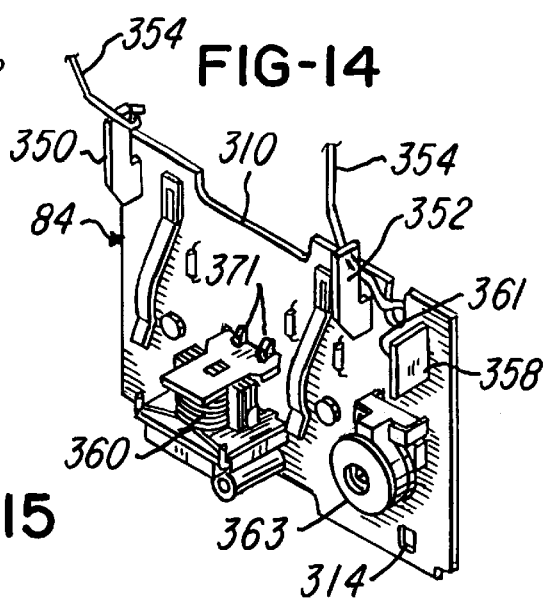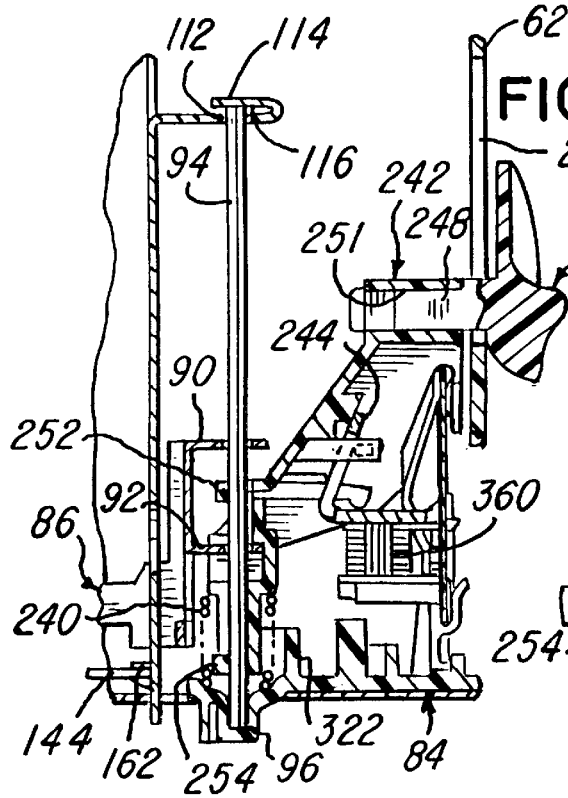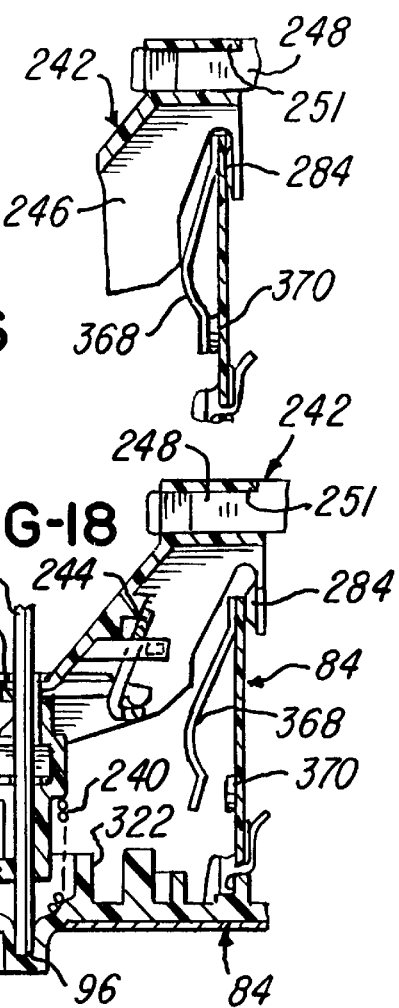

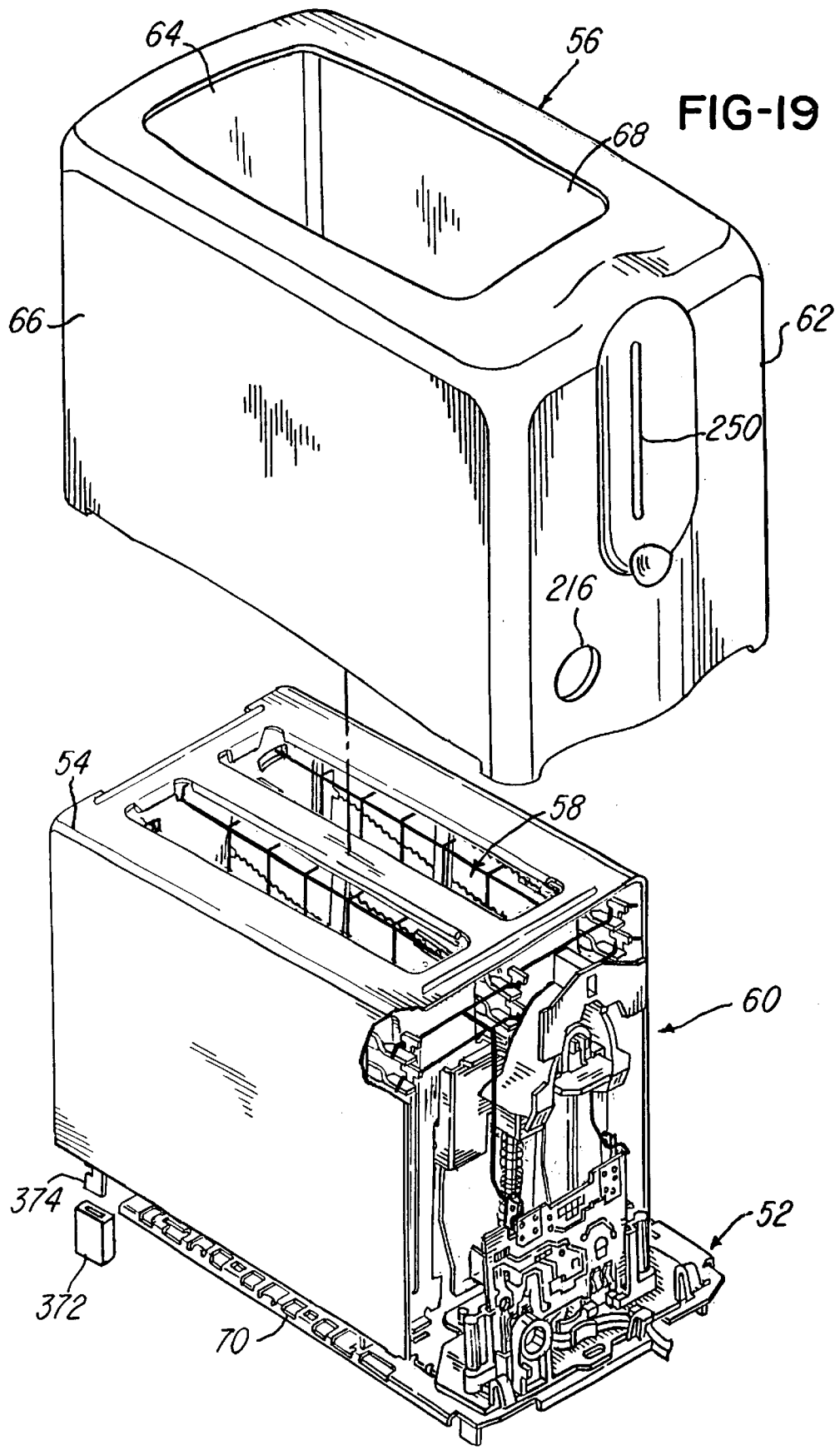

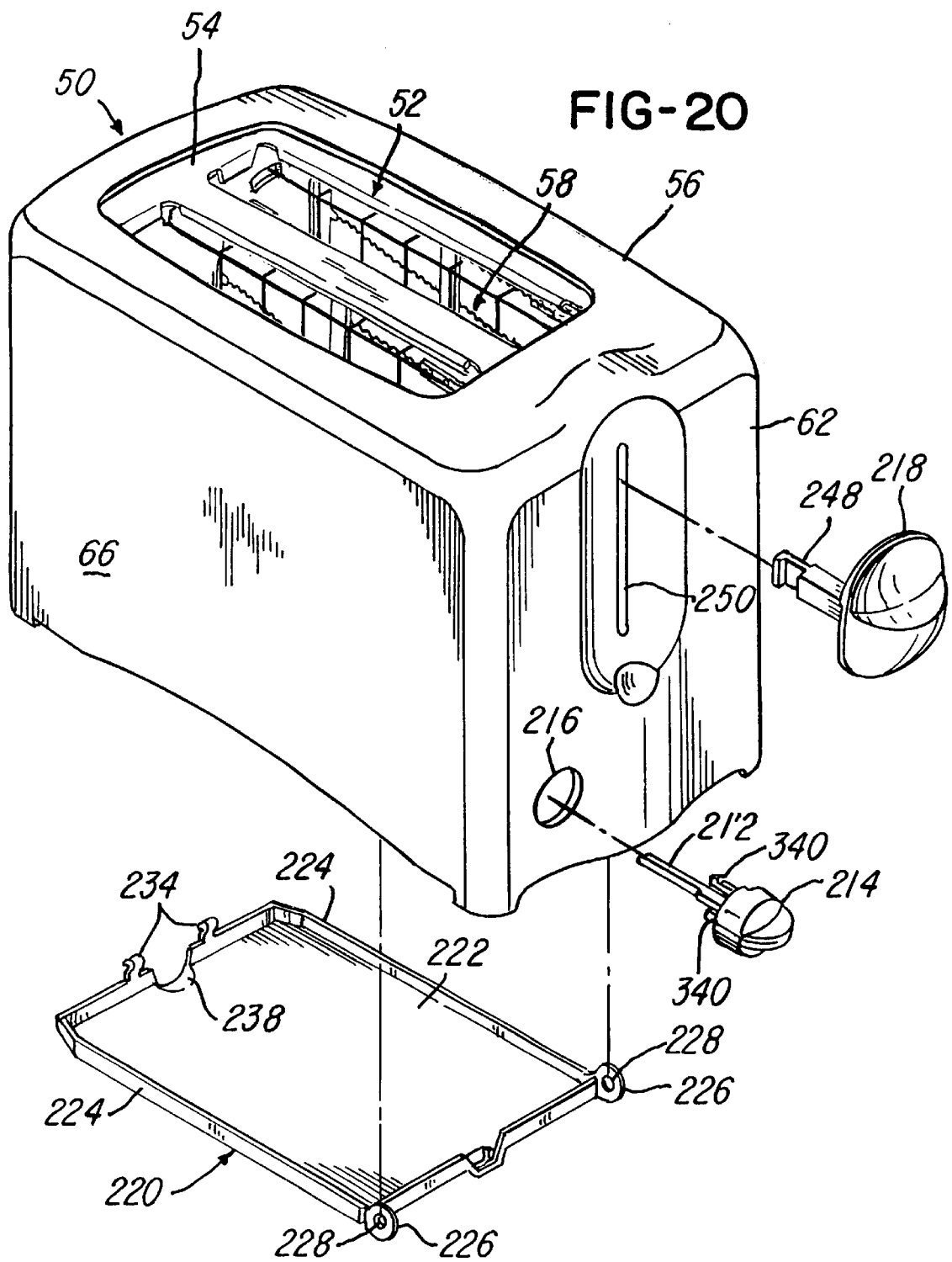

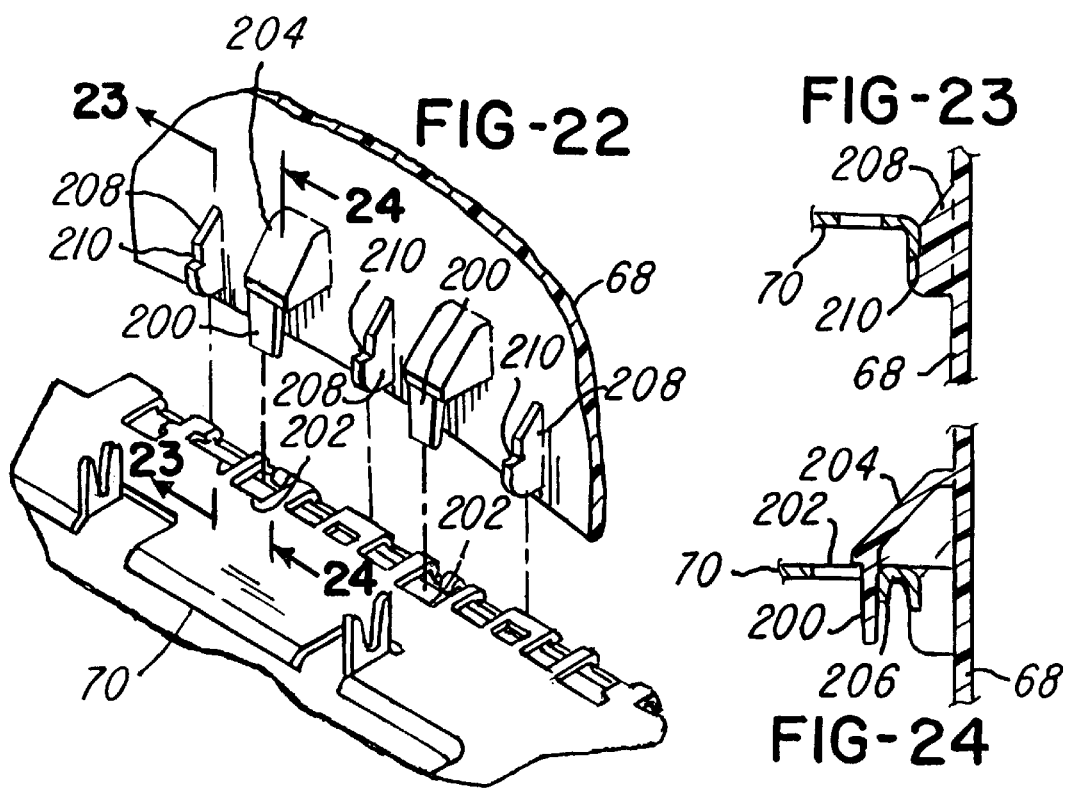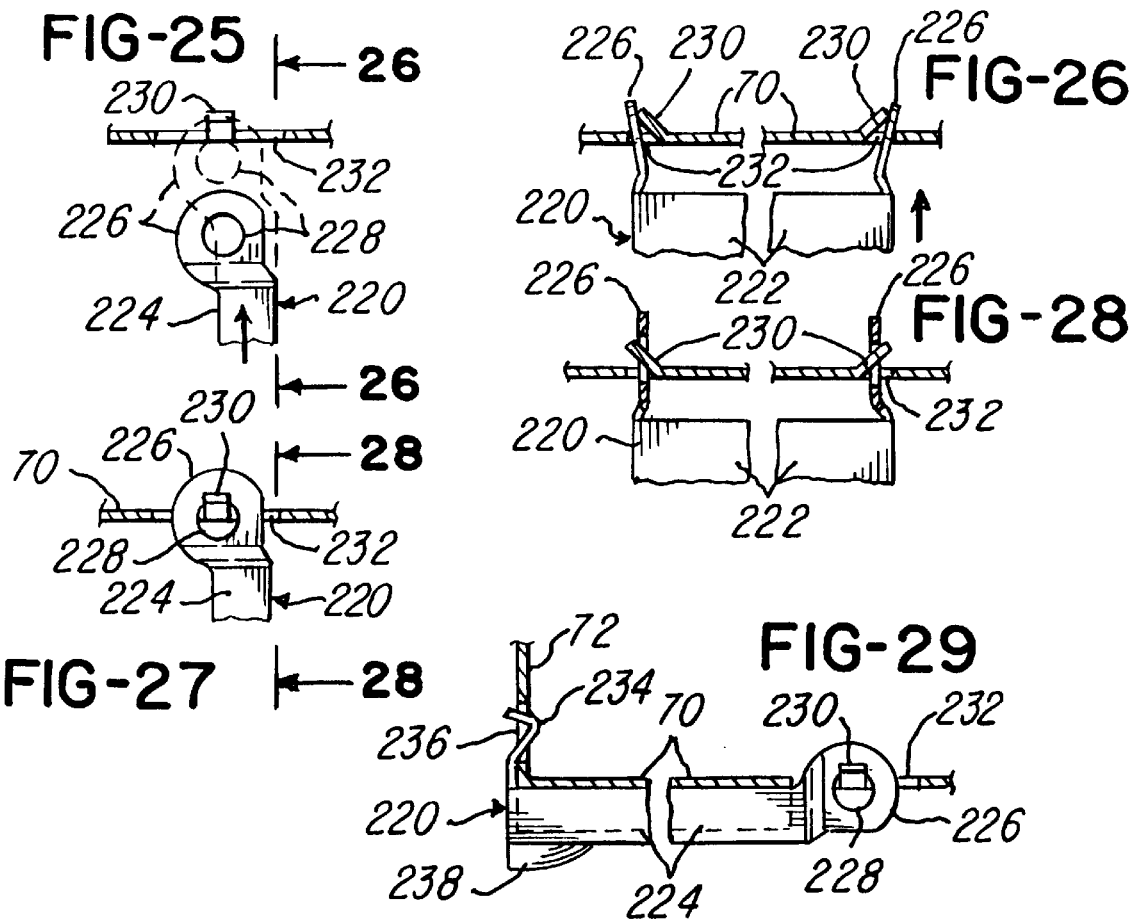

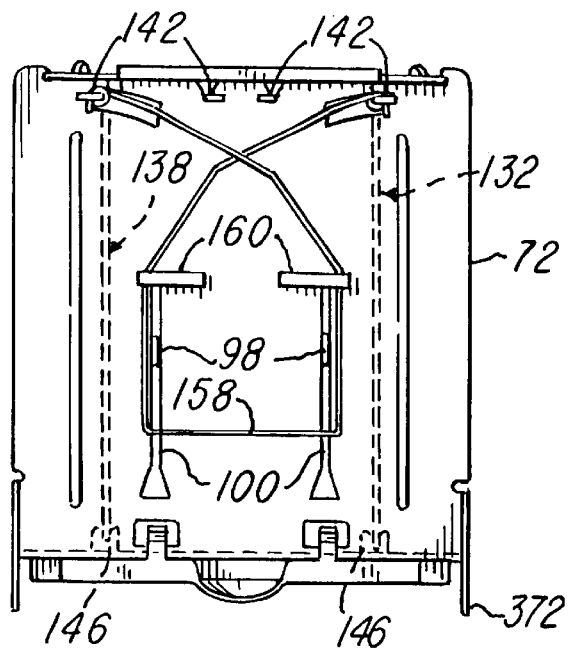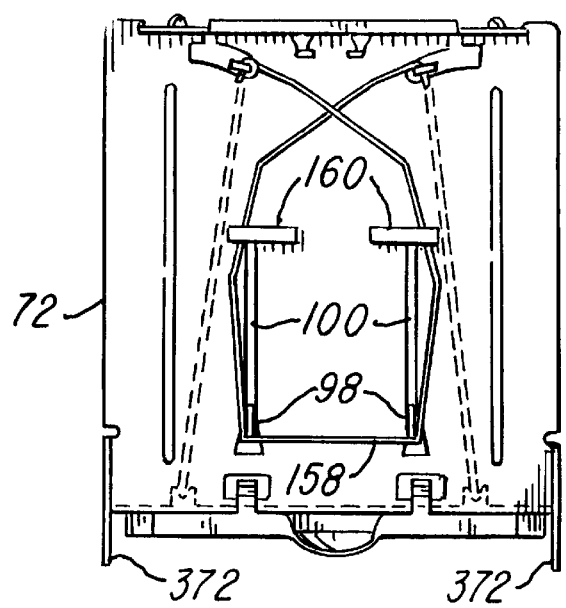
FIG-30    FIG-31
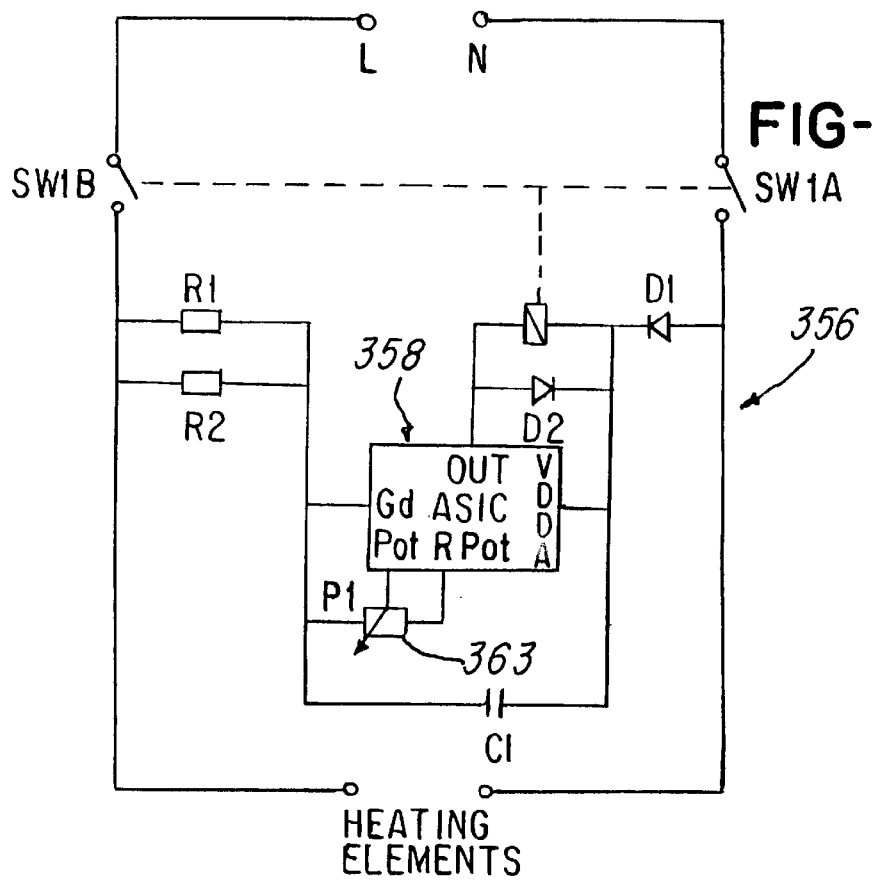
FIG-32

HOUSEHOLD ELECTRONIC TOASTER AND METHOD OF MANUFACTURE

CROSS-REFERENCE TO RELATED APPLICATION

This application is a divisional of application Ser. No. 08/944,521, filed Oct. 6, 1997, now U.S. Pat. No. 5,429,407.

FIELD OF THE INVENTION

This invention relates to a household electronic toaster and a method of manufacturing the same, but aspects of this invention can be used in other heating appliances, particularly toasters for commercial use.

BACKGROUND OF THE INVENTION

Household toasters commonly have a housing confining a toasting chamber and heating elements within the toasting chamber between which a pair of bread support arms are vertically-movable between a lowered position for toasting bread or other food items to a raised position for permitting the bread or other food items to be placed on or removed from the bread support arms.

Some toasters have only one bread support arm and some have more than two bread support arms. For ease of discussion, this invention is disclosed for use in the toaster configuration which has two bread supports, such presently being the most common configuration. However, as will become apparent, several aspects of this invention described below can be used in other toaster configurations.

A pair of wire grills located on each side of each bread support prevent the food items being toasted from engaging the heating elements. One or both of the wire grills of each pair may be movable toward the other grill and into engagement with the food items as the bread support arms are lowered into the toasting chamber to closely confine the food items in a substantially predetermined position between the heating elements.

In many toasters, the bread support arms are part of a vertically movable support carriage to which the bread supports are connected. Spring means biases the support carriage upwardly so that the bread support arms are normally in their upper, non-toasting position. The support carriage can be lowered to the toasting position by manipulation of a control lever accessible from outside the housing. During a toasting cycle, a latch mechanism holds the support carriage with its bread support arms in their lowered, toasting position. User-adjustable electric or electronic means controls the toasting cycle times during which the bread support arms are latched in their lowered position in order to toast the food items to the desired toast color.

Toasters are often so designed that the support carriage, as it moves down into its latched, toasting position, engages and closes a normally open power switch in a circuit that provides electrical power to the heating elements. The power switch opens as the support carriage subsequently moves upwardly. A hazardous condition can be created if a food item being toasted sticks to the wire grills and prevents the bread support carriage from completing its upward movement and the power switch fails to open. Various constructions have been proposed to ensure that the power to the heating elements is interrupted at or shortly after the end of a toasting cycle even if the bread support carriage does not move upwardly.

The several mechanical and electrical or electronic components derive support from a frame covered by a cover or housing. To provide for convenient removal of bread crumbs or other waste dropping from the food items being toasted, a crumb tray is often pivotally mounted on the base member of the frame.

Notwithstanding the several elements that comprise a household toaster, household toasters are usually remarkably inexpensive. The low cost partly results from the use of sophisticated manufacturing and assembling techniques. There is, however, an ever-present need to improve upon the quality of toasters and the manufacturing and assembling operations used to produce toasters.

SUMMARY OF THE INVENTION

An object of this invention is to provide an improved household electronic toaster and a method for manufacturing the same. More particularly, an object of this invention is to provide a rugged, high quality household toaster which can be manufactured at relatively low cost. To accomplish these objects, this invention utilizes improvements in several areas of toaster construction and operation.

A toaster made in accordance with this invention comprises an electronic circuit including an application specific integrated circuit, commonly called an ASIC, mounted chip-on-board on a printed circuit board, to control the operation of toaster heating elements and an electromagnet to which relatively high voltage is applied to hold an armature carried by a bread carriage and toaster-operating assembly.

In another aspect of this invention, the armature is freely suspended from the bread carriage and toaster-operating assembly and accurately guided onto the electromagnet when the bread carriage is lowered.

In yet another aspect of this invention, the toaster has a one-piece main frame that includes both a base frame plate and a rear frame plate and several economies are obtained by virtue of the construction of the toaster.

In still another aspect of this invention, a one-piece control support member is mounted on the base frame plate that supports both mechanical and electronic assemblies for controlling the operation of the toaster in predetermined relative positions.

In another aspect of this invention, an armature used to hold the bread carriage in a lowered position for toasting is accurately guided into engagement with an electromagnet to assure that the armature will be strongly held by the electromagnet.

In another aspect of this invention, the electromagnet is mounted on a printed circuit board and the armature is loosely suspended from a support housing, the support housing having cam surfaces engaging the printed circuit board as the armature is lowered to assure proper alignment of the armature with the electromagnet.

In a still further aspect of this invention, the armature support housing has switch contact-engaging surfaces that close power switches as the armature and the bread carriage are lowered together.

In a related aspect of this invention, the support housing and the armature can move upwardly relative to the bread carriage if the bread carriage accidentally becomes stuck so that the power switches will assuredly be opened at the end of a toasting cycle.

In a related aspect of this invention, the cam surfaces are supported on plates that provide a barrier between live electricity and the toaster housing or cover.

In a further aspect of this invention, a unique crumb tray mounting arrangement is provided whereby a crumb tray may be mounted on the base frame member without the use of additional parts or tools.

Other objects and advantages of this invention will become apparent in view of the following description taken in conjunction with the accompanying drawings.

BRIEF DESCRIPTION OF THE DRAWINGS

FIG. 1 is a fragmentary, exploded, perspective view of parts of a toaster in accordance with this invention, including a base frame including a base frame plate and a frame back or rear plate, an electronic circuit assembly including a printed circuit board, and a control support member on which the printed circuit board is mounted.

FIG. 2 is a fragmentary perspective view similar to FIG. 1 and showing, exploded, a bread support assembly.

FIG. 3 is a fragmentary, exploded perspective view of a printed circuit board terminal clip or edge connector and a support therefor that is part of the control support member of FIGS. 1 and 2.

FIG. 4 is a fragmentary, cross-sectional view taken along section line 4—4 of FIG. 1 of the parts shown in FIG. 3 when assembled together.

FIG. 5 is a fragmentary, cross-sectional view similar to FIG. 3 and in addition shows a printed circuit board.

FIG. 6 is a fragmentary, cross-sectional view showing a locating tab which assists in accurately positioning the control support member on the frame base plate.

FIG. 7 is a fragmentary, cross-sectional view showing a retaining clip which assists in securing the control support member to the frame base plate.

FIG. 8 is a perspective view similar to FIG. 2 and includes, shown exploded, a frame front plate mounted on the main frame.

FIG. 10 is an exploded perspective view similar to FIG. 9 and additionally includes, shown exploded, four wire grills pivotally mounted on the frame.

FIG. 11 is a perspective view similar to FIG. 10 and additionally includes, shown exploded, two side heating elements mounted on the frame base plate, a torsion spring confined adjacent the rear frame plate and having ends connected to the rearward ends of two of the wire grills, a frame top plate mounted on the frame front and rear plates, and a rear heat shield mounted on the frame top plate.

FIG. 12 is a perspective view similar to FIG. 11 and additionally includes, shown exploded, electrical bus bars, and a heat shield for the top and sides of the frame.

FIG. 13A is a perspective view of a carriage control member which is one of the components of FIG. 13, but as viewed from different direction.

FIG. 13B is an enlarged perspective view of a control support member which is another one of the components of FIG. 13.

FIG. 13C is a perspective view of the control support member on the same scale as FIG. 13B, but as viewed more from above the support member than FIG. 13B.

FIG. 13D is a perspective view of the control support member on the same scale as FIGS. 13B and 13C, but as viewed generally from below the support member.

FIG. 14 is a fragmentary perspective view of the electronic circuit assembly of FIG. 1 in accordance with this invention and busses connected to terminals thereof.

FIG. 15 is a fragmentary, vertical cross-sectional view of parts of the toaster illustrated in FIG. 13 and showing the position of parts when the bread support assembly is elevated in its non-toasting, rest position.

FIG. 15A is an enlarged view of the portion of the toaster enclosed within circular section line 15A of FIG. 15.

FIG. 15B is a fragmentary cross-sectional view taken along section line 15B—15B of FIG. 15A.

FIG. 16 is a fragmentary, vertical cross-sectional view of parts of the toaster illustrated in FIG. 15 but showing the position of parts when the bread support assembly is lowered to its toasting position.

FIG. 17 is a fragmentary, vertical cross-sectional view of parts of the toaster illustrated in FIG. 16 but simplified by removal of parts to show the closure of the power switch.

FIG. 18 is a fragmentary, vertical cross-sectional view of parts of the toaster illustrated in FIG. 15 but illustrating the opening of the power switch while the bread support assembly remains in its lowered position.

FIG. 19 is a perspective view similar to FIG. 12 and additionally includes, shown exploded, a hollow plastic cover that covers the front, rear and top of the frame, the heat shield and the control chamber, and a safety foot attached to the rear frame plate.

FIG. 20 is an exploded perspective view showing in addition to the frame and plastic cover, control knobs and a crumb tray of a complete toaster in accordance with this invention.

FIG. 22 is a fragmentary, exploded perspective view showing details of connection of the hollow cover to the frame base member.

FIG. 23 is a cross-sectional view taken on section line 23—23 of FIG. 22.

FIG. 24 is a cross-sectional view taken on section line 24—24 of FIG. 22.

FIG. 25 is a diagrammatic, fragmentary exploded, cross-sectional view demonstrating the connection of the crumb tray to the frame base member.

FIG. 26 is a fragmentary, cross-sectional view taken along line 26—26 of FIG. 25 and showing the crumb tray partly assembled onto the frame base member.

FIG. 27 is a fragmentary cross-sectional view similar to FIG. 25 showing the crumb tray pivotally connected to the frame base member.

FIG. 28 is a fragmentary, cross-sectional view taken along line 28—28 of FIG. 27.

FIG. 29 is a fragmentary, cross-sectional view showing the crumb tray pivotally suspended at one end from the frame base plate and clipped at its other end to the frame rear plate.

FIGS. 30 and 31 are rear elevational views of the frame rear member and illustrate the manner in which the torsion spring causes a pivotal movement of the outer wire grills.

FIG. 32 is a diagrammatic and schematic diagram of the control circuit of this invention.

DETAILED DESCRIPTION

Figure 9:
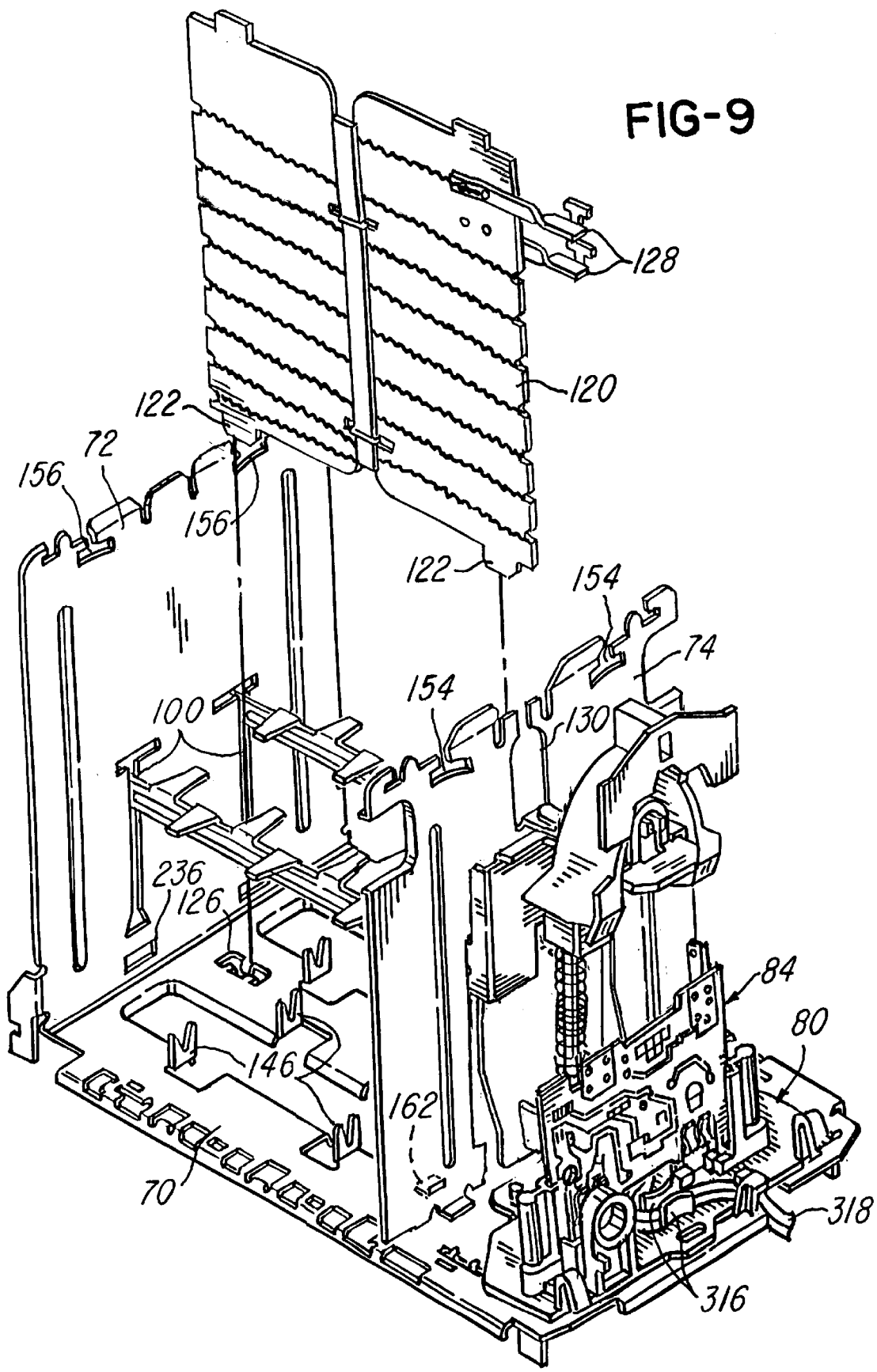
FIG. 9 is a perspective view similar to FIG. 8 and includes, shown exploded, a center heating element mounted on the base frame plate.

With reference first to FIGS. 19 and 20, this invention is shown embodied in a household electric toaster 50 comprising a frame 52 partly covered by a covering heat shield 54 and a plastic body or cover 56. As is common in toaster constructions, the toaster 50 has a toasting chamber 58 and a control chamber 60. For convenience, the control chamber 60 is considered to be at the front end of the toaster 50; the opposite end is considered to be the back or rear end. With this understanding, the cover 56 has a front wall 62, a back or rear wall 64, and a pair of sidewalls 66 and 68 spanning between the front wall 62 and the back wall 64. Like relative terms are made herein to the front, back or rear and sides of the frame 52. Thus, with reference to FIG. 11, the frame 52 comprises four frame members or plates, namely a base frame plate 70, a rear frame plate 72, a front frame plate 74 and a top frame plate 76. The front frame plate 74 separates the toasting chamber 58 from the control chamber 60.

In accordance with this invention, as shown in FIG. 1, the base frame member 70 and the rear frame member 72 are formed as a one-piece main frame, generally designated 78. After a toaster control support member, designated 80, is mounted on the front end of the base frame member 70, a bread support and toaster-operating assembly 82 is positioned on the toaster control support member 80 as indicated in FIG. 2. Here it may be noted that FIGS. 1 and 2 show an electronic control assembly 84 mounted on the toaster control support member 80. In practice, the electronic control assembly 84 is preferably mounted on the control support member 80 at a later stage in the manufacture of the toaster 50.

With continued reference to FIG. 2, and also to FIGS. 8, 13, 13A, 15 and 16, the bread support and toaster-operating assembly 82 comprises a one-piece sheet metal bread carriage 86 having a vertical carriage plate 88 located within the control chamber 60 provided with an upper, horizontal, forwardly-extending guide plate 90 and a lower, horizontal, forwardly-extending guide plate 92. Guide plates 90 and 92 have aligned apertures so they can slide on a vertical support and guide post 94 having a lower end which is nested in a socket 96 formed in the control support member 80. The one-piece bread carriage 86 additionally includes a pair of bread support arms 98 that extend through the heating chamber 58 and, for purposes to be described below, through respective ones of a pair of vertical slots 100 in the rear frame member 72.

Figure 21:
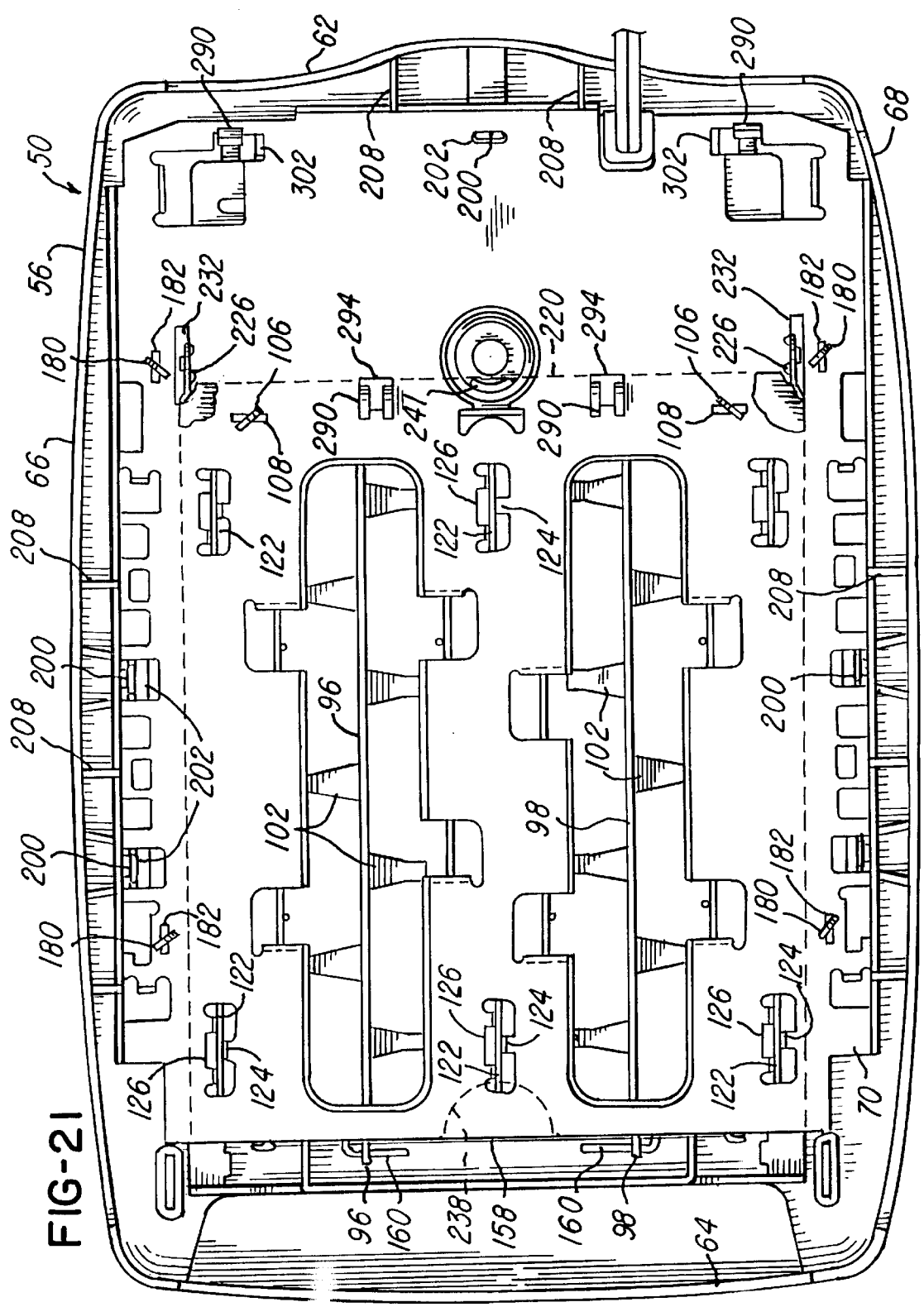
FIG. 21 is a bottom plan view of the toaster including fragments of the front end of the crumb tray, the remainder of the crumb tray being shown by phantom lines.

To ensure adequate support for food items being toasted, the bread support arms 98 have generally horizontally-extending tabs 102 projecting from both sides thereof. The front ends of the support arms 98 have vertical carriage plate-connecting portions 104 integrally joined to the carriage plate 88. As indicated in FIG. 8, the front frame member 74 has a pair of downwardly-extending mounting tabs 106 which are inserted into cooperating apertures 108 in the base frame member 70. Later on, the tabs 106 are twisted, as shown in FIG. 21, to permanently secure the front frame member 74 to the base frame member 70. A pair of vertical carriage slots 110 in the front frame member 74 slidable receive the support arm connecting portions 104 to enable the front frame member 74 to be lowered into engagement with the base frame member 70 without being obstructed in this movement by the bread support arms 98.

As the front frame member 74 is almost completely lowered into engagement with the base frame member 70, the upper end of the support and guide post 94 enters an aperture 112 (FIGS. 15 and 16) in a forwardly-extending leaf 114 struck out from the front frame member 74. The leaf 114 is bent back upon itself to form an upper stop 116 which, together with the socket 96, hold the support and guide post 94 in a fixed vertical orientation.

As shown in FIG. 9, the toaster 50 further includes a center heating element 120 having downwardly-extending mounting tabs 122 which are received between locating fingers 124 in a pair of tab-receiving apertures 126 (see also FIG. 21) in the base frame member 70. Upper and lower terminals 128 extend from the center heating element 120 into the control chamber 60 through an opening 130 in the front frame member 74.

With reference to FIG. 10, four wire grills 132, 134, 136 and 138, each of which has an array of vertically-extending grill wires 140 spanning between and connected, as by welding, to an upper, horizontal grill wire 142 and a lower horizontal grill wire 144. The lower grill wires 144 each rest in respective pairs of horizontally-spaced, V-shaped grill-support pads 146 (see also FIGS. 1 and 2) struck up from the metal forming the base frame member 70. The front and rear ends of the upper grill wires 142 of the centermost grills 134 and 136 are received in mutually-aligned, vertically extending slots 150 and 152, respectively, formed in the upper ends of front frame member 74 and the rear frame member 72. Slots 150 and 152 are only a little wider than the thickness of the upper grill wires 142 so that the centermost grills 134 and 136 are substantially confined to their vertical orientations.

The front and rear ends of the upper grill wires 142 of the outermost grills 132 and 138 are received in mutually-aligned, vertically-extending, inverted T-shaped slots 154 and 156, respectively, formed in the upper ends of the front frame member 74 and the rear frame member 72. The leg portions of the inverted T-shaped slots 154 and 156 are slightly wider than the upper grill wires 142 but the head portions of the T-shaped slots 154 and 156 are considerably wider to permit the outermost grills 132 and 138 to pivot about axes formed by their respective V-shaped support pads 146. It will be noted that both ends of all of the horizontal upper grill wires 142 are formed or bent at approximately 90° to their major axes and are thus prevented from sliding either forwardly or rearwardly.

Referring now to FIGS. 11, 30 and 31, the ends of the upper grill wires 142 of the outermost grills 132 and 138 are bent outwardly toward the sides of the toaster. Furthermore, the uppermost ends of a wire torsion spring 158 have loops which are received by the rear ends of the outermost upper grill wires 142. The torsion spring 158 is confined behind the rear face of the rear frame member 72 by a pair of blades 160 struck out from the metal forming the rear frame member 72. The upper end portions of the torsion spring 158 cross over one another above the rearward ends of the bread support arm 98 whereas the lower corners of the torsion spring 158 extend below the rearward ends of the bread support arms 98. In operation, after the bread support carriage 86 has begun to be lowered to its toasting position as will be described below, the lower corners of the torsion spring 158 are pulled downwardly by the rear ends of the bread support arms 98 whereupon the looped ends of the torsion spring 158 pull the outermost upper grill wires 142 toward the center of the toaster. Accordingly, the outermost grills 132 and 138 pivot about the axes defined by their respective V-shaped supports 146 into engagement with the food items being toasted. The torsion spring 158 is sufficiently weak that the wire grills 132 and 138 will not harm the food items they engage but will merely tend to force the food items toward the center heating element.

During the lowering of the bread carriage 86, the torsion spring 158 tends also to pull downwardly on the outermost upper grill wires 142 and thereby to cause the front ends of the outermost grills 132 and 138 to rise. This could cause the front ends of the outermost upper grill wires 142 to engage and bind against the margins of the inverted T-shaped slots 154 at the top of the front frame plate 74. This problem is obviated by a pair of rearwardly-extending ledges 162 (see also FIG. 15) struck out from the metal forming the front frame member 74 which overlie the front ends of the lower horizontal grill wires 144 of the outermost grills 132 and 138. The ledges 162 prevent the front ends of the outermost grills 132 and 138 from rising up without binding the grills 132 and 138 in any way.

With continued reference to FIG. 11, the toaster 50 includes a pair of side heating elements 164, each having upper and lower terminals 166 which extend through respective openings at the upper sides of the front frame member 74. The side heating elements 164 may be constructed and mounted on the base frame member 70 identically to the center heating element 120. Thus the side heating elements have tabs 122 located between other sets of locating fingers 124 (FIG. 21) in other pairs of tab-receiving apertures 126.

The top frame member 76 has, as conventional, large openings 168 to provide access for placing food items on the bread support arms 98. It is permanently connected to the rear frame member 72 and the front frame member 74 by tabs 170 which are extended through slots 171 and twisted to secure the frame members 72, 74 and 76 together. Before the tabs 170 are twisted, the top frame plate 76 may be loosely connected to the front and rear frame plates 72 and 74 sufficiently to hold the frame plates 72, 74 and 76 together during subsequent assembly operations. The means loosely connecting the frame members comprise upwardly angled flanges 163 at the sides of the top frame member 76 and mounting hooks 165 located at both upper ends of the front and rear frame plates 72 and 74. During assembly of the top frame plate 76 onto the front and rear plates 72 and 74, the top frame plate 76 is pushed downwardly so that the outer edges of the flanges 163 slide along mutually confronting surfaces of the mounting hooks 165. The flanges 163 and mounting hooks 165 are sufficiently resilient to enable the flanges 163 to lightly snap fit under the mounting hooks 165. Plural openings 172 are provided in the top frame member 76 to receive and confine tabs 174 projecting upwardly from both heating elements 164. The openings 172 are designed to slidably receive the tabs 174 to permit the heating elements 164 to be assembled onto the toaster frame after the top frame member 74 is secured to the front and rear frame members.

A rear heat shield 176 may optionally be connected to or made integral with the top frame member 76. The rear heat shield 176, if separate as illustrated, may be mounted on the top frame member by the upwardly-extending tabs 170 at the upper end of the rear frame member 72, the tabs 170 extending through slots 178 in the rear heat shield 176.

With reference to FIG. 12, the covering heat shield 54 which covers the entire sides and top of the parts which form the toasting compartment 58 is secured to the toaster frame 52 by downwardly-extending mounting tabs 180 on the covering heat shield 54 that are extended through holes 182 in the base frame member 70 and twisted.

With continued reference to FIG. 12, a horizontal upper wire rod-like bus bar 184 spans across and connects to the upper heating element terminals 128 and 166. A horizontal lower wire rod-like bus bar 186 connects to the lower heating element terminals 128 and 166. Each of the terminals 128 and 166 has an upwardly-projecting, T-shaped, bus-engaging contact 188. Both horizontal bus bars 184 and 186 have arcuate, rearwardly-extending, side terminal-contacting end portions 190 and an arcuate, forwardly-extending, center terminal contacting center portion 192. The end portions 190 of each bus bar extend behind the side bus-engaging contacts 188 and the center portion 192 extends in front of the center bus-engaging contact 188. Both bus bars 184 and 186 have sufficient resilient memory that they firmly engage the bus-engaging contacts 188, pressing forwardly on the side contacts 188 and rearwardly on the center contacts 188.

Vertical busses 194 and 196 extend downwardly from the respective upper and lower bus bars 184 and 186 for connection to the electronic control assembly 84 as will be further described below.

With reference to FIGS. 19 and 21 through 24, after the parts are assembled as shown in FIG. 12, the plastic body or cover 56 is connected by a snap-fit to the base frame member 70. With reference to FIGS. 21 through 24, the inside surfaces of the sidewalls 66 and 68 of the cover 56 have a pair of downwardly-extending spade-like locating tabs 200 aligned with locating holes 202 in the side of the base frame member 70. Locating tabs 200 extend downwardly from support members 204. The locating holes 202 have inverted U-shaped fingers 206 along their outer edges that space the locating tabs 200 from the inside edges of the locating holes 202. Also extending from the inside surfaces of the sidewalls 66 and 68 are three ribs 208 having upwardly-facing notches 210 which support the base frame member 70.

During assembly of the cover 56 onto the base frame member 70, the cover 56 is aligned with the base frame member 70 and the cover 56 is pressed downwardly so that the fingers 206 guide the locating tabs 200 into the locating holes 202. At the same time, the cover sidewalls 66 and 68 flex outwardly so the ribs 208 can slide downwardly along the outer edges of the base frame 70 until the rib notches 210 snap under the outermost side edges of the base frame member 70. As shown in FIG. 21, the inside wall of the cover front wall 62 also has a spade-like locating tab 200 in a locating hole 202 in the front end of the base frame member 70 and a pair of notched ribs 208 for snap-fitting the cover front-wall 62 to the base frame member 70 when the cover 56 is pressed downwardly into engagement with the base frame member.

In addition to guiding the cover 56 into proper alignment with the base frame member 70, the locating tabs 200 also effectively preclude a user from pulling the sides or front of the cover 56 away from the base frame member 70 and disengaging the notched ribs 208 without the use of a tool. The disclosed mounting of the cover 56 on the base frame member 70 enables a secure mounting without the use of screws and does not require tools to assemble.

Final assembly of the toaster 50 is illustrated in FIG. 20. A toaster color control shaft 212 having a color control knob 214 is inserted through an aperture 216 in the cover front wall 62 and a bread lifter knob 218 is connected to the bread support and toaster-operating assembly 82. Also, a crumb tray 220 is pivotally mounted on the base frame member 70. The connection of the color control shaft 212 and the bread lifter knob 218 will be further described below. Features relating to the crumb tray 220 are illustrated in FIGS. 20 and 25 through 29. There it will be noted that the crumb tray 220 comprises a rectangular plate 222 having upstanding sidewalls 224. A pair of upwardly-offset mounting ears 226 having apertures 228 therethrough are located generally in axial alignment with the sides of the plate 222. These ears 226 are pivotally mounted on mounting pins 230 struck upwardly from the metal forming the base frame member 70 leaving small mounting pin apertures 232 through which the ears 226 extend. The mounting pins 230 extend upwardly and outwardly at an angle of approximately 45° from the surrounding plane of the base frame member 70 as shown best in FIGS. 26 and 28. The spacing between the ears 226 on the crumb tray 220 is slightly less than the spacing between the outer, free end edges of the mounting pins 230. Accordingly, as evident from FIGS. 27 through 29, the ears 226 can pivot on the mounting pins 230.

With reference to FIG. 29, the rearward end of the crumb tray 220 has a pair of upstanding spring latch hooks 234 that fit into apertures 236 (FIG. 29) in the rear frame member 72 to resiliently secure the rearward end of the crumb tray 220 to the base frame member 70. When the crumb tray 220 is latched as shown in FIG. 29, its top edges closely underlie the base frame member 70 and the tray 220 is held in a horizontal orientation due to the suspension of the raised ears 226 from the mounting pins 228 and the latching of the hooks 234 in the rear frame apertures 236. An arcuate finger-engageable surface 238 between the latch hooks 234 is provided to enable a user to push the rear end of the crumb tray 220 downwardly for cleaning purposes.

As illustrated in FIGS. 25 through 28, the crumb tray 220 can be assembled onto the base frame plate 70 simply by aligning the ears 226 with the mounting pin apertures 230 and pressing the front end of the crumb tray 220 toward the base frame plate 70. Being made from sheet metal, the ears 226 and the mounting pins 228 flex to enable the ears 226 to snap onto the mounting pins 230 as shown in FIGS. 28 and 29.

In FIG. 20, it will be noted that the crumb tray 220 has a downwardly-extending pocket 239. This is provided so that the crumb tray 220 can be pivoted between a horizontal and a vertical orientation without interference from the portion of the socket 96 that extends below the base frame plate 70. A barrier wall 241 shown in FIGS. 13D and 21, which is part of the control support member 80, substantially closes the gap created by the pocket 239 when the crumb tray 220 is in its horizontal orientation, such as it is during toasting cycles. Closure of the gap may be important to prevent cooling air from flowing into the toasting chamber 58 and causing localized cooling of the heating elements 120 or 164 which can produce uneven toasting food items.

Referring to FIGS. 2, 13, 13A, 15, 15A and 15B, a bread lifter spring 240 coiled about the lower end of the guide post 94 biases the bread carriage 86 upwardly. A carriage control member, generally designated 242, forming part of the bread support and toaster-operating assembly 82, is used to lower the bread carriage 86 and carries an armature 244 that is part of the latch mechanism that holds the bread carriage 86 in a lowered, toasting position during a toasting operation. The carriage control member 242 comprises a one-piece body 246 preferably molded from the same plastic material used to mold the control support member 80. The bread lifter knob 218 has a control shaft 248 that extends through a vertical slot 250 in the front wall 62 of the cover 56 and through a channel or socket 251 in the control member body 246. The control shaft 248 is substantially rigidly connected in any suitable manner to the body 246. The body 246 is formed with an upper eyelet 252 slidable on the post 94 between the two carriage guide plates 90 and 92 and a lower eyelet 254 slidable on the post 94 beneath the lower guide plate 92. Control member 242 also includes a vertically-extending, three-sided, bread carriage-engaging member 256 between the eyelets 252 and 254. Carriage-engaging member 256 has a first, lower, downwardly-facing shoulder 258 which bears against the upper end of the lifter spring 240 and a second, upper, downwardly-facing shoulder 260 adapted, as described below with reference to FIG. 16, to bear down on the upper surface of the lower carriage guide plate 92 when the bread carriage 86 is lowered into the toasting position. The carriage-engaging member 256 also has an upwardly facing shoulder 262 that engages the lower carriage guide plate 92 when the bread carriage 86 is lifted by the lifter spring 240.

Figure 13:
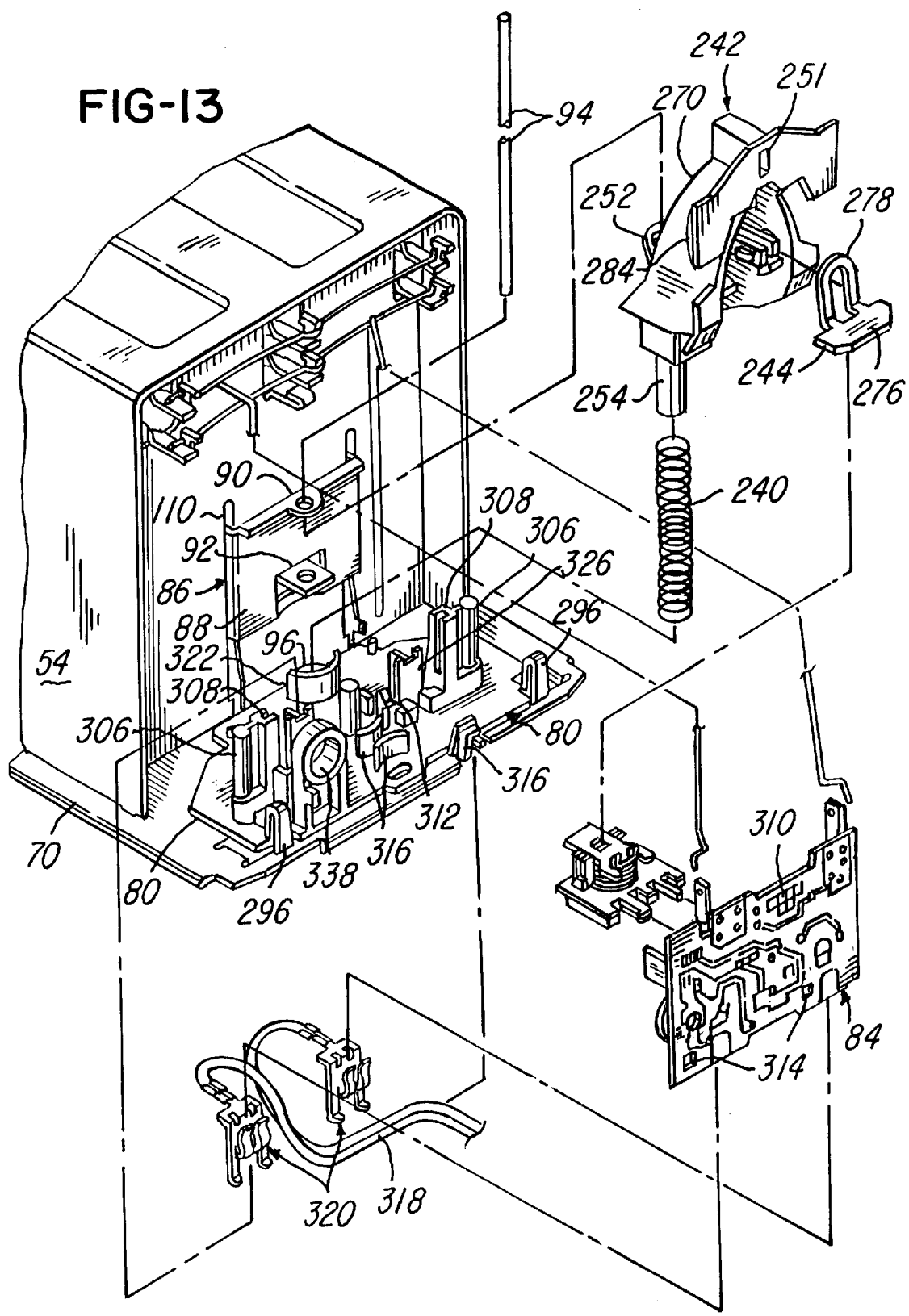
FIG. 13 is a fragmentary perspective view of the front end of the toaster showing, exploded, components for controlling the operation of the toaster.

With reference to FIGS. 13, 13A, 15, 15A and 15B, the control member 242 includes an armature support housing 270 extending upwardly and forwardly from the armature support member 256. The armature support housing 270 is open to the front of the toaster and includes a pair of horizontal, armature-supporting spring fingers 272 that have protuberances 274 on their respective outer sides. As best shown in FIG. 13, the armature 244 comprises an armature body or plate 276 and an inverted U-shaped handle 278 connected to the rear of the plate 276. The legs of the armature handle 278 straddle the spring fingers 272 behind the protuberances 274 so that the armature 244 is freely suspended from the spring fingers 272. A guide plate 280 extending forwardly from the rear wall of the armature support housing 270 and the protuberances 274 loosely confine the armature 244 with its armature plate 276 in a substantially horizontal orientation. Downwardly-facing stop flanges 281 extending inwardly from the inside surfaces of the armature support housing 270 prevent the armature 244 from accidentally bouncing upwardly and the inside surfaces of the housing 270 prevent excessive sideways movements of the armature 244. In sum, the armature 244 is loosely suspended within the support housing 270 so that it has substantial freedom of movement but the armature plate 276 is invariably in a substantial horizontal orientation.

Referring, for example, to FIGS. 13 and 15, for reasons which will become apparent, the armature support housing 270 has a pair of cam plates 282 and a pair of switch-operating pads 283 extending from the center to the respective opposite sides thereof. The cam plates 282 have vertically-extending cam members 284 on their rearwardly-facing surfaces.

Turning now to FIGS. 1, 6, 13, 13B, 13C and 13D, the toaster control support member 80 is molded in one piece from a suitable plastic material that can withstand the temperatures encountered in the control chamber 60. One suitable plastic is a glass-filled polyester material sold under the trademark Valox by GE Plastics division of General Electric Company, Pittsfield, Mass. The support member 80 comprises a base plate 288 rigidly secured to the base frame member 70 by two pairs of hooks 290 depending from the rear of the base plate 288 that hook under the rear margins of a pair of cooperating apertures 294 in the base frame plate 70 and by a pair of spring clips 296 at the front of the base frame plate 70 that extend through and hook under the forward margins of cooperating apertures 300 in the base frame plate 70. A pair of centering fingers 302 depending from the front of the base plate 288 engage opposite, outwardly facing surfaces 304 of the latter apertures 300 to maintain the intended location of the control support member 80.

Control support member 80 has several functions with regard to the supporting of the electronic control components. Thus, the support member 80 has a pair of upright stanchions 306 which have mutually confronting vertical slots 308 that slidably receive the sides of a printed circuit board 310 which forms part of the electronic control assembly 84. Accidental removal of the printed circuit board 310 is effectively prevented by a pair of upright hold down clamps 312 having downwardly facing shoulders that are resiliently cammed out of the way as the printed circuit board 310 is inserted into the vertical slots 308 but that, after the printed circuit board 310 is fully lowered, snap forwardly into windows 314 in the lower portion of the printed circuit board 310.

Several power cable guide members 316 lead and provide strain relief for a power cord or cable 318 which extends from a pair of terminal clips 320 through a cable notch 321 at the front of the base frame plate 70. A semicircular wall 322 maintains a separation between the power cable 318 and the lifter spring 240. As best shown in FIG. 5, the terminal clips 320 are edge connectors that slidably receive the lower edge of the printed circuit board 310 and engage edge terminal contacts 324 thereon that provide power to the electronic control assembly 84. This construction enables connection of the power cable 318 to the printed circuit board 310 without the use of solder or welding. The terminal contacts 324 are sufficiently thick to handle the 120 volt household current to which they are exposed.

With reference to FIGS. 3, 4, 5, 13, 13B, 13C and 13D, the support member 80 further includes a pair of T-shaped terminal clip support members 326 having planar front faces notched at their upper ends to form short, upwardly-extending posts 328. As best seen in FIG. 3, each terminal clip 320 is bent at 90° and post-receiving notches 330 are formed at the 90° bend so that the clip 320 can fit flush with the front face of its support member 326 with the posts 328 extending through the notches 330. Additionally, the terminal clips 320 have downwardly-extending legs 332 on each side thereof, with forwardly-extending feet 334 that are received within pockets 336 located at the bottom of each support member 326. During assembly of the terminal clips 320 onto the support members 326, the front face of the clips 320 are stressed by being slightly bent so that the clips 320 are securely retained by the posts 328 and the pockets 336.

A hollow cylindrical bearing 338 (FIGS. 13, 13B and 13C) formed on the control support member 80 provides a bearing for the color control knob 214, which has mounting fingers having hooks 340 (FIG. 20) that engage behind the bearing 338.

Referring to FIG. 14, the printed circuit board 310 has two output terminals 350 and 352 connected to respective vertical busses 354 that provide electrical energy to the toaster heating elements through an electronic circuit 356 shown in FIG. 32. The resistors R1 and R2 and the diode D1 convert the 120 volt AC supply to 70 volt half-wave rectified DC which appears across the capacitor C1 and the VDDA port of a chip-on-board ASIC 358 which is mounted on a daughter board 361 (FIG. 14) projecting rearwardly from the printed circuit board 310. The daughter board 361 preferably has a metal backing for better cooling of the ASIC 358. Free-wheeling diode D2 enables the AC operation of an electromagnet 360. The electromagnet 360 preferably operates at approximately 70 volts AC maximum but at a duty cycle of less than approximately 25% and preferably on the order of 15% so that the average voltage across the electromagnet 360 is substantially lower than 70 volts. A potentiometer 363 is adjusted by rotation of the color control knob 214 and determines the duration of each toasting cycle. The duration of a toasting cycle may be altered by the ASIC 358 taking into account the recent history of operation of the toaster, that is, the delay time following a recent toasting cycle. Variations in the starting temperature and the line voltage will inevitably have an effect upon the operating characteristics of the ASIC 358, which effects can be used to make accommodating adjustments in toasting times.

The electronic circuit 356 provides several advantages. Of particular importance is that the electromagnet 360 can be small and require little space within the control chamber 60. The electromagnet 360 can be inexpensive, yet quite strong, because it operates at a high voltage level. Also, the capacitor C1 provides the current to operate a history counter in the ASIC 358 during the intervals between toaster operations so that no line current is drawn during toaster off intervals.

Chip-on-board ASICs are inexpensive and do not require a host of other, expensive electronic components normally associated with the use of programmable counters or microcomputers often used for electronic control of toasting appliances.

Those familiar with the art will recognize that the programming of the ASIC will depend upon the particular operating parameters desired by the toaster manufacturer. For example, the lowest potentiometer setting may be recognized by the ASIC logic circuit to constitute a power-off setting that could be used to terminate a toasting cycle or it could simply be a setting for the shortest toasting cycle. ASICs can be obtained from various sources. XFAB of Erfurt, Germany is one such company.

To initiate a toasting operation, when the bread lifter knob 218 is pushed down from its position shown in FIG. 15 to its position shown in FIG. 16, the switch-operating pads 283 on the armature support housing 270 also lower and engage a pair of spring power switch contacts 368 on the printed circuit board 310, causing them to engage fixed contacts 370 to provide electrical energy to the circuit 356 (note FIG. 17). The electromagnet 360 is thereby energized to attract and hold the armature 244 for the duration of the toasting cycle. During downward movement, the carriage control member 242 is so oriented that the armature 244 is held directly above and properly aligned with the electromagnet 360 by the engagement of the cam members 284 on the cam plates 282 with the front face of the printed circuit board 310.

Maximum holding strength is obtained if the armature plate 276 lies flush on top of the electromagnet 360. This obtains in the case of the toaster 50 because of the manner in which the armature 244 is loosely supported by the armature support housing 270, so that it will be unaffected by any slight misalignment in the orientation of the carriage control member 242. Further to ensure that the armature plate 276 lies flush on top of the electromagnet 360, a pair of downwardly and rearwardly sloping ramps 371 are provided on the forward part of the top surface of the electromagnet 360. In the event the armature plate 276 has swung forwardly, it will engage the ramps 371 during its downward motion and by guided thereby into a truly horizontal orientation.

When the armature 244 is held by the electromagnet 360, the shoulder 260 of the carriage-engaging member 256 bears down on the lower carriage guide plate 92 to hold the bread carriage 86 is its lower, toasting position. At the end of a toasting cycle, the electromagnet 360 is deenergized and the lifter spring 240 presses upwardly on the carriage control member 242, resulting in the release of the spring power switch contacts 358, as shown in FIG. 18, and interrupting power to the heating elements 120 and 164. Ordinarily, at this time the lifter spring 240 will push the carriage control member 242 and the bread carriage 86 upwardly to permit removal of the toasted food items.

In the event the bread carriage 86 resists upward movement, such as might occur if a food item being toasted gets stuck in one of the wire grills 132, 134, 136, or 138, the bread carriage 86 could remain in its position illustrated in FIG. 18. In such case, the carriage control member 242 is still lifted by the spring 240 to the extent necessary to open the power switches, as also shown in FIG. 18. Such upward movement of the carriage control member 242 is permitted by the lost motion determined by the distance through which the control member 242 moves upwardly from the position in which its downwardly facing shoulder 260 engages the upper face of the lower guide plate 92, as shown in FIG. 16, into the position in which its upwardly facing shoulder 262 engages the lower surface of the lower guide plate 92, as shown in FIG. 18.

In FIG. 15, the bread carriage 86 is shown lifted to an elevation determined by the length and strength of the bread lifter spring 240. That elevation is preferably less than the full elevation of the bread carriage 86, the upper limit of which is determined by the height of the carriage slots 110 above the base frame plate 70. The spring 240 is preferably so constructed that it raises the bread support arms 98 to an elevation within the toaster 50 that enables the user to easily grasp taller pieces of bread or other items being toasted. To raise shorter food items in position to be grasped, the user can simply lift up on the bread lifter knob 218 and, as a consequence, further elevate the bread support arms 98.

The glass-filled polyester material used in the molding of the control support member is an acceptable barrier to protect against the hazards associated with live electricity. Because the cover 56 is indented in the area of the cover slot 250, the cover 56 is near the circuit board outlet terminals 350 and 352. However, the cam plates 282, if made from Valox or other suitable barrier material, provide an acceptable safety barrier between the terminals 350 and 352 and the toaster cover 56.

It will be observed that there are several holes along both sides of the base frame plate 70 which are not used for connection to other parts of the toaster. These are provided to minimize the transfer of heat to the sides of the plate 70 that could cause an overheating of the plastic cover 56, which is preferably made from polypropylene or other inexpensive plastic which softens at relatively low temperatures. Underwriter's Laboratories (UL) has an "alcove" test which subjects a toaster to operation for eight hours under conditions in which heat is not readily dissipated. As a precaution, a pair of plastic feet 372 (FIGS. 19, 30 and 31) that are snugly fitted over plates 374 that extend below and behind the rear frame plate 72. The feet 372 prevent the rearward end of the toaster frame 52 from falling a significant distance in the event the cover 56 becomes so soft that the parts that connect the cover to the base frame plate 70 can no longer support the weight of the metal parts of the toaster.

The assembly of the toaster can proceed substantially as illustrated beginning with FIG. 1 and continuing, in sequence, with the steps illustrated in FIGS. 2, 8, 9, 10, 11, 12, 19 and 20, with the exception that the printed circuit board 310 is preferably not assembled until after the side element boards 164. However, there are obviously several variations to this sequence which could be employed. One preference permitted by the design of the toaster is to preassemble the power cord and the control support member 80 so that these parts can be installed together on the base frame plate 70. Of course, it is essential to assemble the bread carriage 86 on the base frame plate 70 before mounting the front frame plate 74.

It will be appreciated that the plastic cover 56 could be replaced by a metal cover (not shown) with metal or plastic end panels (not shown), as is common in the art. In such case, the covering heat shield 54 may not be used. Another obvious variation is that the toaster could have one or more than two bread supporting arms rather than the two arms 98 illustrated herein.

Those familiar with the art will realize that this invention incorporates substantial economies. The economies effected by using a chip-on-board ASIC in the control chamber to control the operation of the toaster and the use of an inexpensive, small electromagnet are important. In addition, only three heating elements, electrically connected in parallel are used and the three heating elements can have identical constructions. The wire grills 132, 134, 136 and 138 preferably also have identical constructions.

Here it may be noted that all three heating elements will produce the same heat energy but the heat produced by the side heating elements will in part be reflected toward the food items in the toaster by the sides of the heat shield 54 or, optionally, a metal cover, thereby effectively increasing the heat to which the outer sides of the food items being toasted are exposed. To more evenly heat both sides of food items being toasted, the bread support arms 98 are located closer to the center heating element 120 than to the side heating elements 164.

Although the presently preferred embodiment of this invention have been described, it will be understood that various changes may be made without departing from the scope of the following claims. As an example, although the use of three heating elements instead of four heating elements provides a cost savings, four heating elements could readily be used.

Having thus described our invention, we claim:

1. A method of manufacturing a toaster comprising the steps of forming a base frame member and a rear frame member in one piece, mounting a plastic toaster control support member on the base frame member, mounting a vertical support post on said support member; mounting a bread carriage on said support post, said bread carriage having a pair of bread support arms, and thereafter mounting a front frame member having a pair of slots open to the bottom edge of said front frame member by aligning said slots with said support arms and moving said front frame member into engagement with said base frame member.

2. The method of claim 1 further comprising locating the top of said support post in a socket formed on said front frame member as said front frame member is moved into engagement with said base frame member.

* * * * *